US012620741B2

(12) United States Patent
Tanigawa et al.

(10) Patent No.: US 12,620,741 B2
(45) Date of Patent: May 5, 2026

(54) FEMALE TERMINAL, CONNECTOR, BUSBAR, TERMINAL-EQUIPPED ELECTRIC WIRE, CONNECTOR-EQUIPPED ELECTRIC WIRE, AND WIRE HARNESS

(71) Applicants: FURUKAWA ELECTRIC CO., LTD., Tokyo (JP); FURUKAWA AUTOMOTIVE SYSTEMS INC., Inukami-gun (JP)

(72) Inventors: Tomoaki Tanigawa, Inukami-gun (JP); Takeshi Watanabe, Inukami-gun (JP); Yukihiro Kawamura, Inukami-gun (JP); Junya Takeshita, Tokyo (JP); Takahiro Imamura, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 420 days.

(21) Appl. No.: 18/328,233

(22) Filed: Jun. 2, 2023

(65) Prior Publication Data

US 2023/0307859 A1 Sep. 28, 2023

Related U.S. Application Data

(63) Continuation of application No. PCT/JP2021/043265, filed on Nov. 25, 2021.

(30) Foreign Application Priority Data

Dec. 4, 2020 (JP) ................................ 2020-202165
Jul. 27, 2021 (JP) ................................ 2021-122460

(51) Int. Cl.
*H01R 13/187* (2006.01)
*H01R 13/115* (2006.01)
(Continued)

(52) U.S. Cl.
CPC ......... *H01R 13/187* (2013.01); *H01R 13/115* (2013.01); *H01R 25/14* (2013.01); *H01R 43/02* (2013.01)

(58) Field of Classification Search
CPC .... H01R 13/187; H01R 13/115; H01R 25/14; H01R 4/184
(Continued)

(56) References Cited

U.S. PATENT DOCUMENTS 6,196,884 B1 3/2001 Tanaka
7,150,660 B2 12/2006 Allgood et al.
(Continued)

FOREIGN PATENT DOCUMENTS

CN 103022759 A * 4/2013
EP 1 289 071 B1 12/2006
(Continued)

OTHER PUBLICATIONS

WO2010098157-A1 machine translation (Year: 2010).*
(Continued)

*Primary Examiner* — Tulsidas C Patel
*Assistant Examiner* — Jeffrey Mountain
(74) *Attorney, Agent, or Firm* — Oblon, McClelland, Maier & Neustadt, L.L.P.

(57) ABSTRACT

Provided is a female terminal. The female terminal includes a spring member and a terminal main body. The spring member is electrically connected to a male terminal to be connected. The terminal main body includes a base portion which has electrical conductivity and is electrically connected to the spring member. The base portion has a pair of side walls spaced apart by an insertion space that is inserted with a part of the male terminal. The spring member is arranged between the pair of side walls in the base portion, and the spring member is fixed to the side wall with a
(Continued)

conductive welded portion with which the spring member is conductively welded to the side wall.

14 Claims, 24 Drawing Sheets

(51) Int. Cl.
*H01R 25/14* (2006.01)
*H01R 43/02* (2006.01)

(58) Field of Classification Search
USPC .......................................................... 439/843
See application file for complete search history.

(56) References Cited

U.S. PATENT DOCUMENTS

| | | | | |
|---|---|---|---|---|
| 8,668,531 | B2 * | 3/2014 | Yamaguchi | H01R 13/187 439/845 |
| 2003/0060090 | A1 | 3/2003 | Allgood et al. | |
| 2019/0190183 | A1 | 6/2019 | Kato et al. | |
| 2020/0076105 | A1 * | 3/2020 | Seipel | H01R 4/62 |

FOREIGN PATENT DOCUMENTS

| | | | |
|---|---|---|---|
| EP | 1 215 763 | B2 | 12/2007 |
| EP | 2 652 841 | B1 | 12/2015 |
| JP | 2005-505104 | A | 2/2005 |
| JP | 2009-245701 | A | 10/2009 |
| JP | WO2010/098157 | A1 | 9/2010 |
| JP | 2013-546151 | A | 12/2013 |
| JP | 2014-238940 | A | 12/2014 |
| JP | 2019-110074 | A | 7/2019 |
| JP | 2020-161374 | A | 10/2020 |
| WO | WO 2014/196446 | A1 | 12/2014 |

OTHER PUBLICATIONS

JP2014238940 machine translation (Year: 2014).*
JP2019110074 machine translation (Year: 2019).*
Japanese Notice of Reasons for Refusal issued Jul. 8, 2025 in Japanese Patent Application No. 2022-566877 with English translation, 14 pgs.
International Search Report issued Dec. 28, 2021 in PCT/JP2021/043265 filed on Nov. 25, 2021, 2 pages.
Extended European Search Report issued Apr. 5, 2024 in European Patent Application No. 21900490.0, 12 pages.

* cited by examiner

10Xd
30X
35
321b
322
27c
25
21d
22
12X
31
(c)
W
H
Hu
Hd
I
L
111
112
20
11

FEMALE TERMINAL, CONNECTOR, BUSBAR, TERMINAL-EQUIPPED ELECTRIC WIRE, CONNECTOR-EQUIPPED ELECTRIC WIRE, AND WIRE HARNESS

TECHNICAL FIELD

The disclosure relates to a female terminal to be mounted on a connector or the like of a wire harness for large current, a connector, a busbar, a terminal-equipped electric wire, a connector-equipped electric wire, and a wire harness, for example.

BACKGROUND ART

Electrical equipment installed in automobiles or the like is connected to other electrical equipment or power supplies through a wire harness, which is a bundle of insulated electric wires, to form an electric circuit. In this case, the wire harness is connected to the electrical equipment and power supplies via respective connectors mounted.

Specifically, a female terminal as illustrated in Patent Document 1 is mounted in a cavity of a connector housing and connected to a connector housing where a male terminal is mounted, so that a part of the male terminal is inserted into the female terminal, whereby the terminals are electrically connected to each other. At this time, a part of the female terminal needs to be pressed into tight contact with the male terminal inserted inside to reliably conduct electricity.

For example, when the current supplied to drive system electrical circuits or the like becomes large, it is necessary that terminals be composed of a thick terminal plate material. Female terminals composed of a thick terminal plate material have a reduced spring property, so that the pressing against male terminals is reduced and electrical conductivity may be reduced.

CITATION LIST

Patent Literature

Patent Document 1: JP 2009-245701 A

SUMMARY

Technical Problem

An object of the disclosure is to provide a female terminal a part of which can, while the female terminal is connected to a male terminal, be brought into tight contact with the male terminal to reliably conduct electricity, a connector, a busbar, a terminal-equipped electric wire, a connector-equipped electric wire, and a wire harness.

Solution to Problem

The disclosure is characterized by being a female terminal, provided with: a spring member to be electrically connected to a male terminal to be connected; and a terminal main body having a base portion, the base portion having electrical conductivity and electrically connected to the spring member, wherein the base portion has a pair of side walls spaced apart by an insertion space configured to be inserted with a part of the male terminal, the spring member is arranged between the pair of side walls in the base portion, and the spring member is fixed to the side wall with a conductive welded portion with which the spring member is conductively welded to the side wall.

Further, the disclosure is characterized by being: a connector comprising the above female terminal and a connector housing accommodating the female terminal; additionally, a terminal-equipped electric wire in which the above female terminal is connected to a tip of an electric wire; further, a connector-equipped electric wire comprising the terminal-equipped electric wire and a connector housing internally housing the female terminal connected to a tip of the terminal-equipped electric wire; and still further, a wire harness including at least one of the terminal-equipped electric wire or the connector-equipped electric wire.

The above welding includes laser welding such as fiber laser welding, electron beam welding, fusion welding such as arc welding, pressure welding such as resistance welding, ultrasonic welding, and friction welding, and brazing such as hard soldering and soldering. The conductive welded portion refers to welded locations such as beads formed by the above welding.

According to the disclosure, the spring member can, while connected to a male terminal, be brought into tight contact with the male terminal to reliably conduct electricity.

Specifically, there is provided: a spring member to be electrically connected to a male terminal to be connected; and a terminal main body having a base portion, the base portion having electrical conductivity and electrically connected to the spring member. The base portion has a pair of side walls spaced apart by an insertion space configured to be inserted with a part of the male terminal. The spring member is arranged between the pair of side walls in the base portion. Thus, the spring member having electrical conductivity can be pressed against and brought into tight contact with a part of the male terminal inserted into the insertion space, with a reaction force by the side walls.

In addition, since the spring member is fixed to the side wall with a conductive welded portion with which the spring member is conductively welded to the side wall, for example, high electrical conductivity can be secured as compared to the electrical conductivity in the configuration where the spring member and the terminal main body are constructed as separate bodies, and merely brought into contact with each other to conduct electricity.

Consequently, while connected to the male terminal, the spring member conductively fixed to the base portion can be brought into tight contact with the male terminal to reliably conduct electricity.

As an aspect of the disclosure, the spring member may be provided for each of the pair of side walls.

According to the disclosure, a part of the male terminal inserted into the insertion space can be sandwiched by and brought into contact with the spring member, which increases the contact area between the part of the male terminal and the spring member. Thus, electrical conductivity can be further improved.

In addition, as an aspect of the disclosure, the spring member may be provided for one of the pair of side walls.

According to the disclosure, a part of the male terminal inserted into the insertion space can be sandwiched between and brought into contact with the spring member and the other of the pair of side walls, and electrical conductivity can be further improved.

In addition, as an aspect of the disclosure, the spring member may have a plurality of arm springs arranged along a direction intersecting a depth direction from an opening toward a deep side of the insertion space, each of the plurality of arm springs having an arm shape and extending along the depth direction in the insertion space.

"An arm shape and extending along the depth direction" refers to an arm shape extending from an opening through which insertion into the insertion space is performed, toward the deep side in the insertion space.

According to the disclosure, inserting a part of the male terminal into the insertion space increases the contact area between the arm spring having an arm shape and extending along the depth direction, and a part of the male terminal, so that electrical conductivity can be more reliably improved without hindering insertion of the part of the male terminal into the insertion space.

Additionally, as an aspect of the disclosure, the conductive welded portion may be formed extending in a direction intersecting a direction in which the arm spring extends.

Note that "formed extending in a direction intersecting" may refer to a line shape or a band shape formed along the intersecting direction, or a substantially long shape formed by dot-shaped conductive welded portions arranged adjacent to each other in the intersecting direction.

According to the disclosure, electrical conductivity between a plurality of the arm springs arranged along the intersecting direction and the base portion can be improved.

Additionally, as an aspect of the disclosure, the spring member may comprise a gripping plate gripping the side wall in cooperation with a base of the arm spring, the gripping plate may be arranged on an outer side of the side wall, and the gripping plate may be conductively welded to the side wall with the conductive welded portion.

According to the disclosure, the arm spring can be conductively fixed to the side wall.

Specifically, since the side wall is gripped by the base of the arm spring and the gripping plate, the arm spring can be stably attached to the side wall. In addition, since the gripping plate arranged on the outer side of the side wall is conductively welded to the side wall, welding workability is improved, and electrical conductivity between the arm spring and the side wall can be surely improved by reliable welding.

Additionally, as an aspect of the disclosure, the terminal main body may be more conductive than the spring member and thicker than the spring member.

According to the disclosure, even with a female terminal in which the terminal main body is composed of a thick plate material with low spring property, the spring member that reliably conducts electricity to the base portion can be brought into tight contact with a part of the male terminal with the conductive welded portion to further improve electrical conductivity.

Additionally, as an aspect of the disclosure, the terminal main body may have a portion in which at least a part of a surface is not plated.

Electrical conductivity between the spring member and the side wall of the base portion is secured by the conductive welded portion. Thus, when securing electrical conductivity by contact between the side wall and the spring member, high electrical conductivity can be secured without performing plating treatment or the like on the surface of the side wall to improve electrical conductivity.

Additionally, the disclosure is characterized by being a female terminal, provided with: a spring member to be electrically connected to a male terminal to be connected; and a terminal main body having a base portion, the base portion having electrical conductivity and electrically connected to the spring member, wherein the base portion has a pair of side walls spaced apart by an insertion space configured to be inserted with a part of the male terminal, the spring member is arranged between the pair of side walls in the base portion, the spring member is fixed to the side wall with a conductive welded portion with which the spring member is conductively welded to the side wall, and a plurality of the conductive welded portions are provided along a predetermined direction.

According to the disclosure, in addition to the above effects, the number of welded points between the spring member and the side wall by a plurality of conductive welded portions increases, that is, the number of electrically conductive points between the side wall and the spring member by the plurality of conductive welded portions increases. Thus, the spring member and the side wall can constitute a so-called parallel circuit, the contact resistance between the spring member and the side wall can be reduced, and electrical conductivity can be improved.

Additionally, the disclosure is characterized by being a female terminal, provided with: a spring member to be electrically connected to a male terminal to be connected; and a terminal main body having a base portion, the base portion having electrical conductivity and electrically connected to the spring member, wherein the base portion has a pair of side walls spaced apart by an insertion space configured to be inserted with a part of the male terminal, the spring member is arranged between the pair of side walls in the base portion, the spring member is fixed to the side wall with a conductive welded portion with which the spring member is conductively welded to the side wall, the spring member is provided for one of the pair of side walls, and a protruding portion protruding toward the one of the pair of side walls is provided at the other of the pair of side walls.

According to the disclosure, in addition to the above effects, the connection blade of the male terminal inserted into the insertion space and connected to the female terminal can be sandwiched from both sides by and brought into contact with the protruding portion and the spring member to reliably obtain electrical conductivity.

Advantageous Effects of Invention

The disclosure can provide a female terminal a part of which can, while the female terminal is connected to the male terminal, be brought into tight contact with the male terminal to reliably conduct electricity, a connector, a busbar, a terminal-equipped electric wire, a connector-equipped electric wire, and a wire harness.

DESCRIPTION OF EMBODIMENTS

One embodiment of the disclosure will be described in detail below together with the following drawings.

Figure 1A:
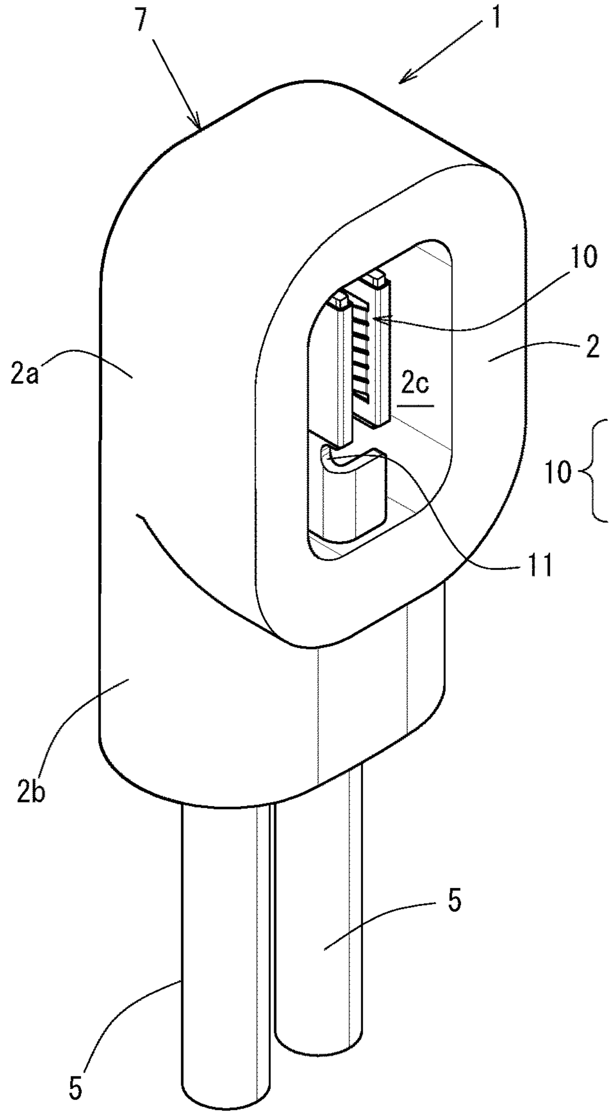
FIGS. 1A and 1B are explanatory views of a connector.
Figure 1B:
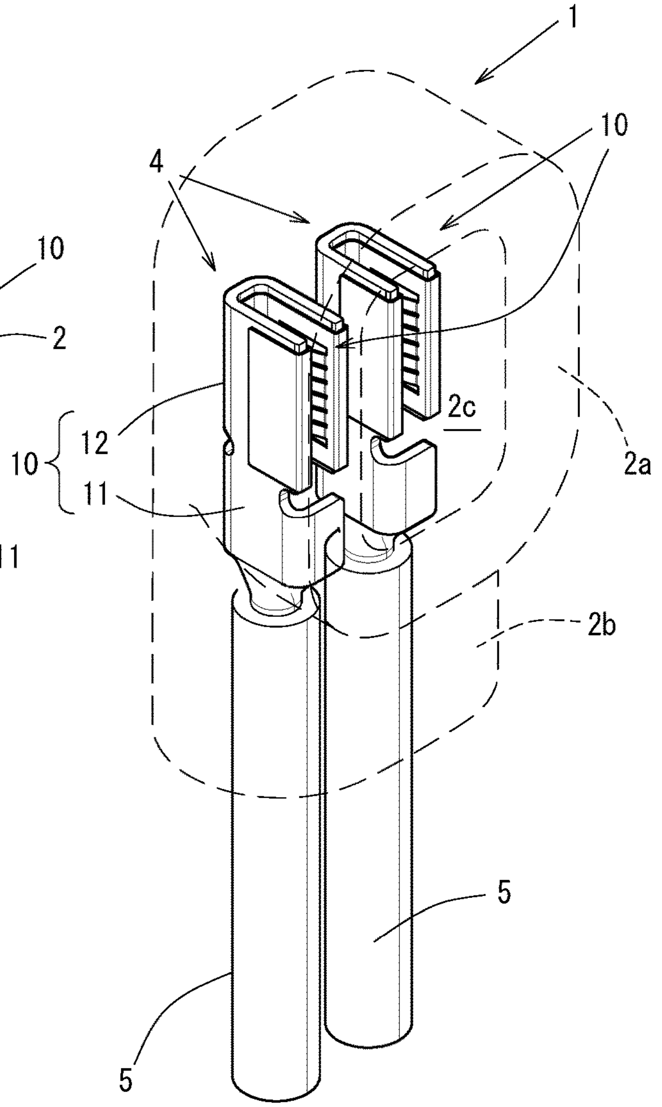
Figure 2:
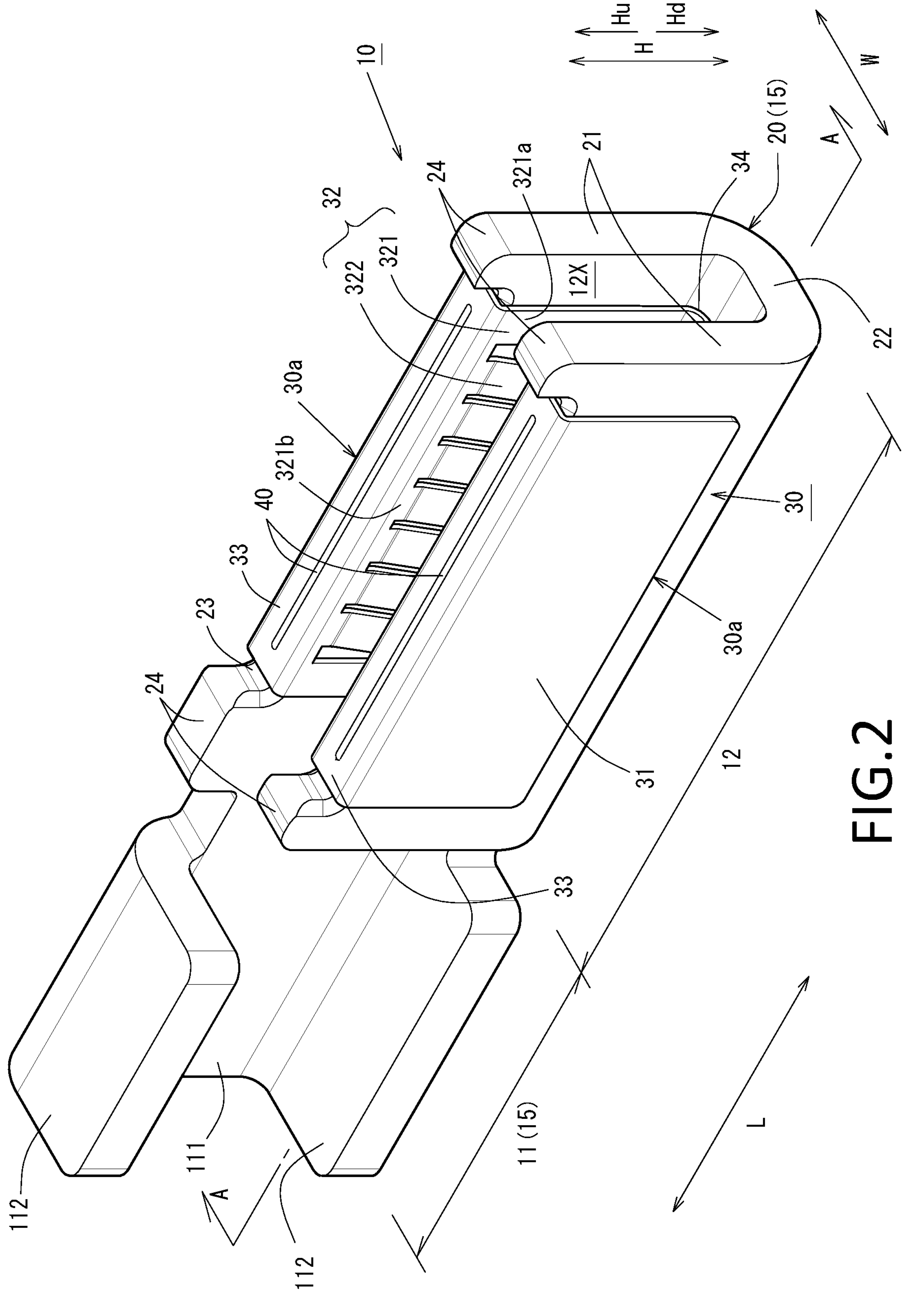
FIG. 2 is a perspective view of a female terminal.

FIGS. 1A and 1B illustrate explanatory views of a connector-equipped electric wire 1. FIG. 2 illustrates a perspective view of a female terminal 10.

FIGS. 3A and 3B, FIGS. 4A and 4B, and FIGS. 6A, 6B, and 6C illustrate explanatory views of the female terminal 10. FIG. 5 illustrates an exploded perspective view of the female terminal 10.

Figure 3A:
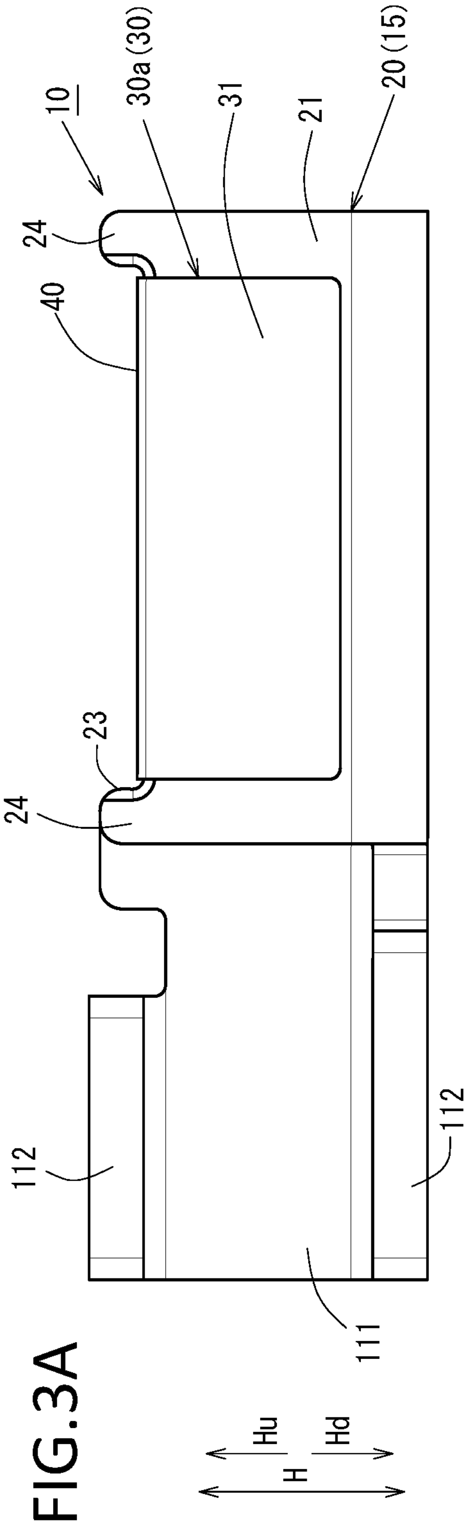
FIGS. 3A and 3B are explanatory views of the female terminal.
Figure 3B:
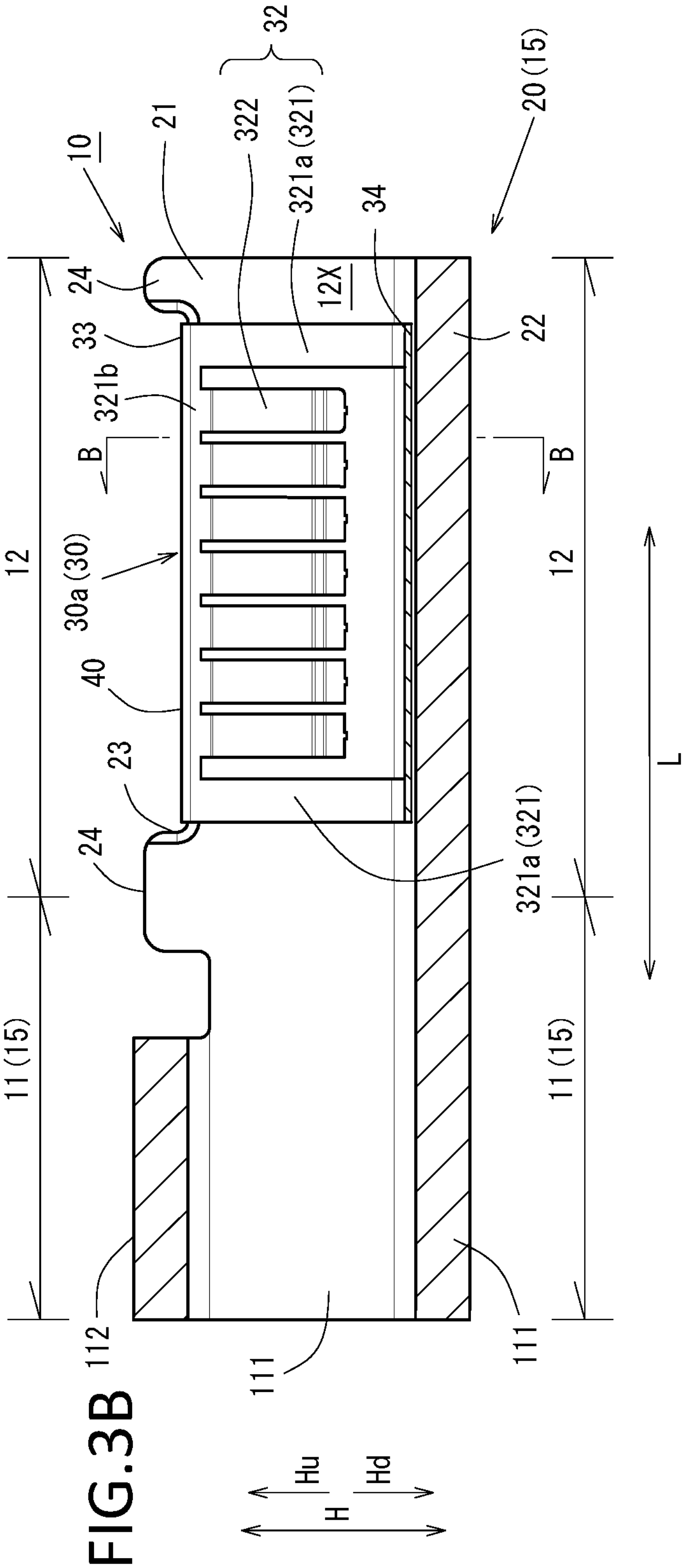

Specifically, FIG. 1A illustrates a perspective view of the connector-equipped electric wire 1. FIG. 1B illustrates a perspective view of the connector-equipped electric wire 1 with a connector housing 2 illustrated in a transparent state. FIG. 3A illustrates a front view of the female terminal 10. FIG. 3B illustrates a cross-sectional view taken along the arrow A-A in FIG. 2.

Figures 4A, 4B:
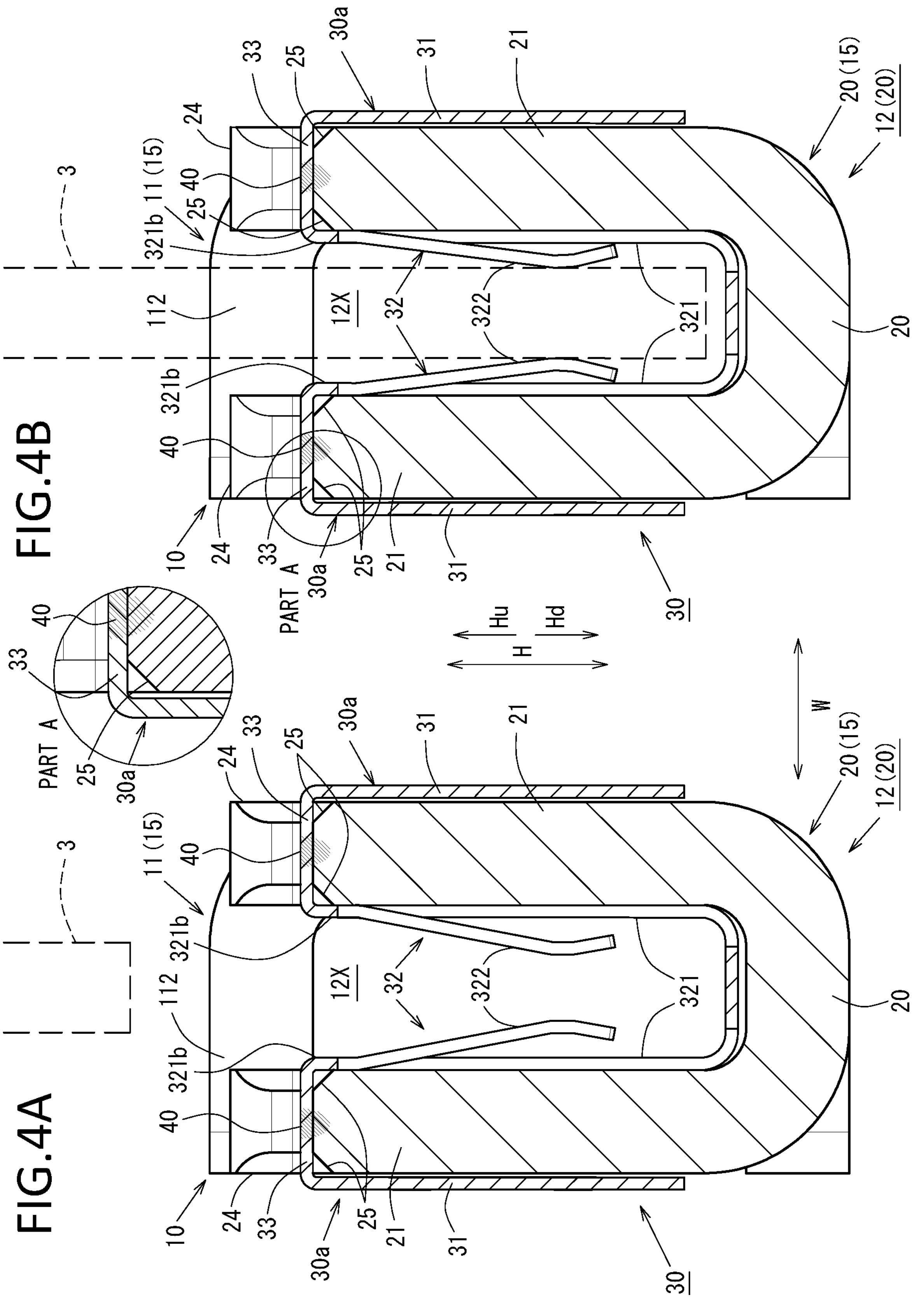
FIGS. 4A and 4B are explanatory views of the female terminal.
Figure 5:
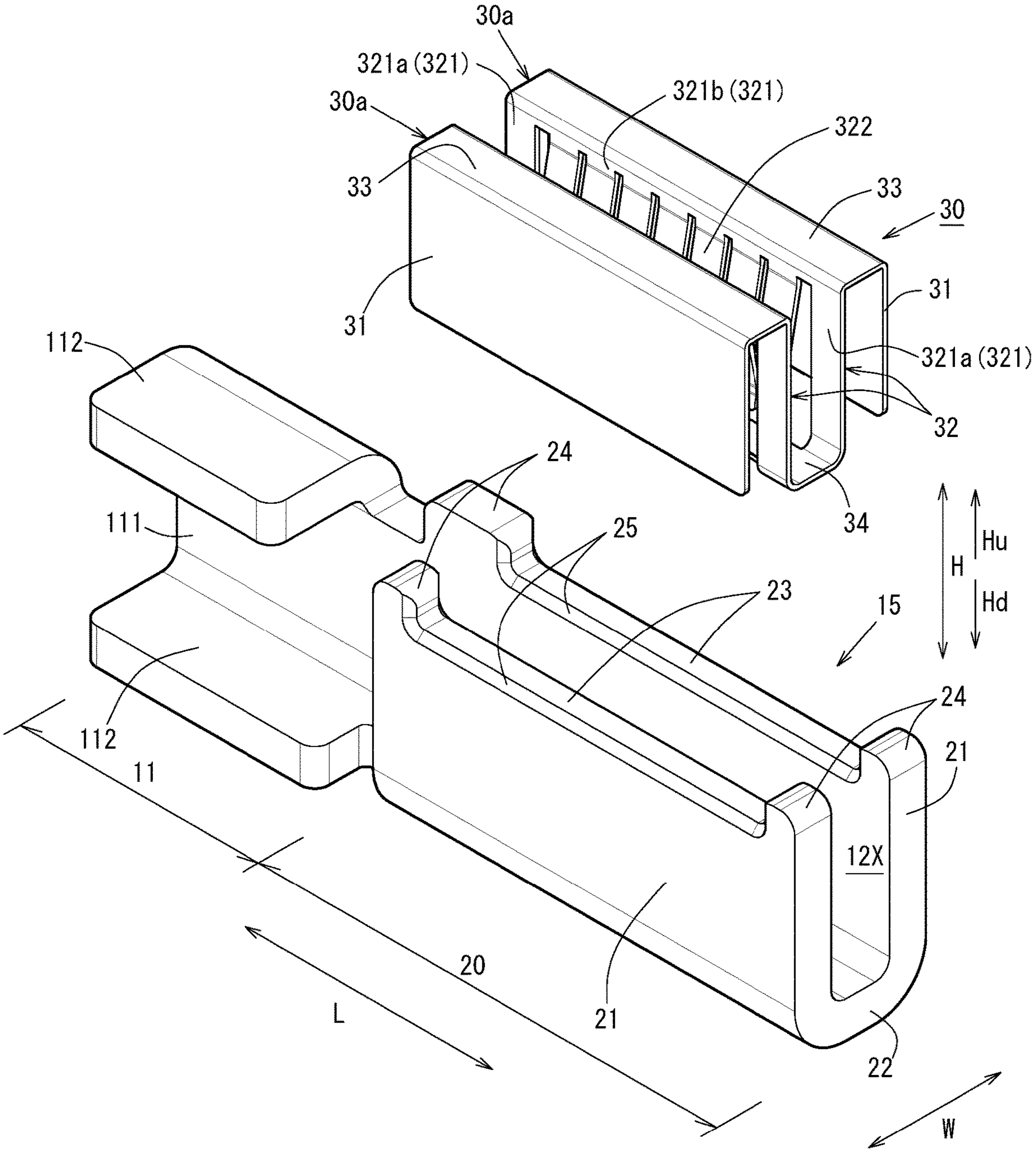
FIG. 5 is an exploded perspective view of the female terminal.
Figures 6A, 6B, 6C:
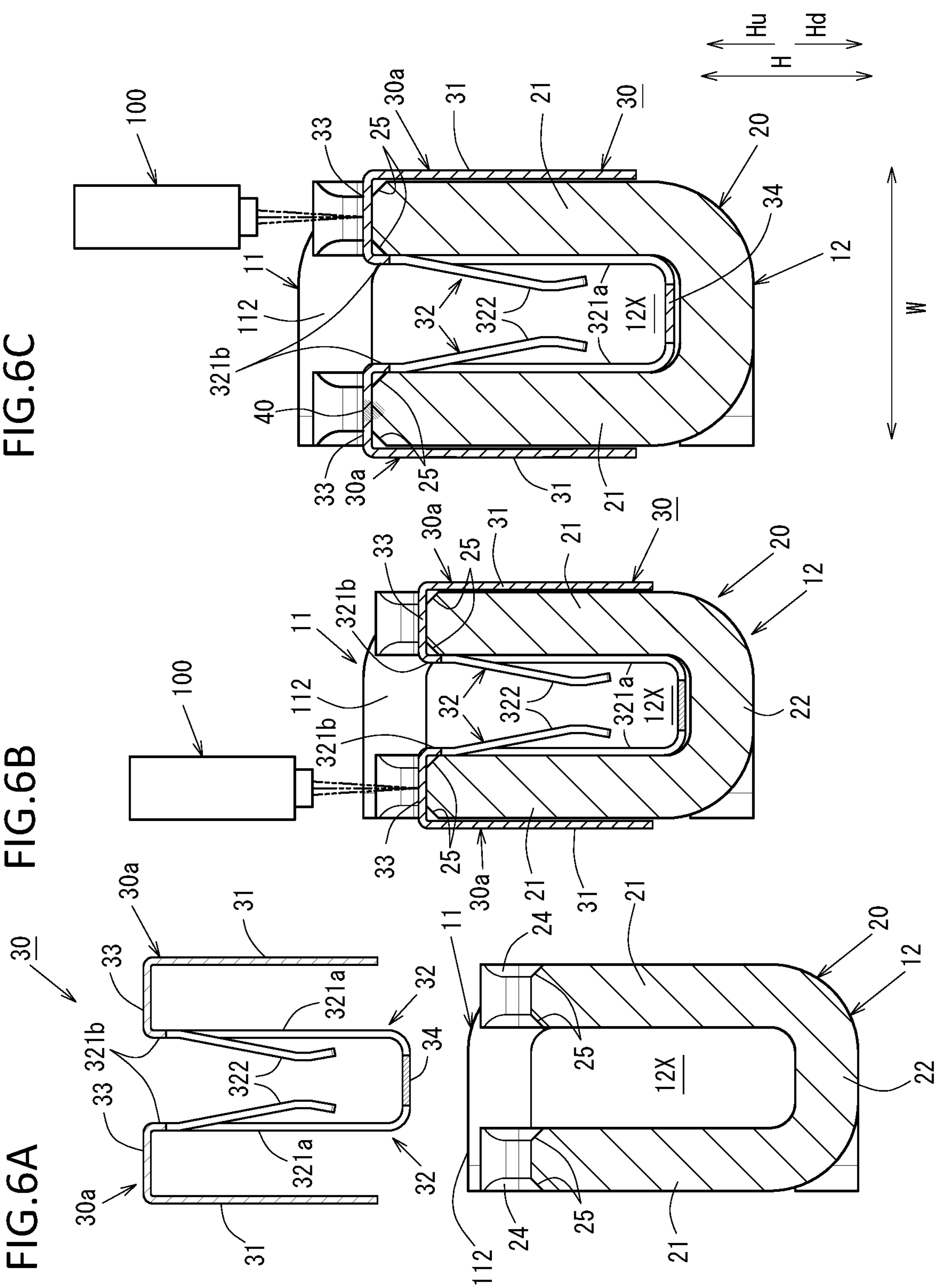
FIGS. 6A, 6B, and 6C are explanatory views of the female terminal.

FIG. 4A illustrates a cross-sectional view taken along the arrow B-B in FIG. 3B. FIG. 4B illustrates a cross-sectional view taken along the arrow B-B in a state of being connected to a connection blade 3, which is a part of the male terminal and has a planar shape. FIGS. 6A, 6B, and 6C are explanatory views of the assembly of the female terminal 10. FIG. 6A illustrates a cross-sectional view taken along the arrow B-B before assembling a base portion 20 to a spring member 30. FIGS. 6B and 6C illustrate cross-sectional views taken along the arrow B-B while the spring member 30 is welded to the base portion 20.

A female terminal 10 described below is constituted by the spring member 30 and the terminal main body 15, and can constitute the connector-equipped electric wire 1 by being arranged inside the connector housing 2, as illustrated in FIGS. 1A and 1B.

The terminal main body 15 has: the base portion 20 having electrical conductivity and electrically connected to the spring member 30; and an electric wire connecting portion 11 to be connected to the electric wire 5, the spring member 30 being to be electrically connected to the connection blade 3 (see FIG. 4B) having a planar shape of the male terminal to be connected.

The electric wire 5 is a round electric wire for large current, in which the inner conductor is covered with insulating covering. An electric wire 5 in which the insulating covering is stripped to expose a conductor at the tip, and to which the female terminal 10 (described later) is connected, is called a terminal-equipped electric wire 4. Note that a wire harness may be constituted by the terminal-equipped electric wire 4.

The connector housing 2 has: a first housing portion 2*a* having a substantially rectangular parallelopiped shape and having an arrangement space 2*c*; and an electric wire insertion portion 2*b* extending from the first housing portion 2*a*. The female terminal 10 of the terminal-equipped electric wire 4 inserted from the electric wire insertion portion 2*b* is arranged in the arrangement space 2*c* inside the first housing portion 2*a*.

The arrangement space 2*c* where the female terminal 10 is arranged is open on the side opposite to the side where the electric wire insertion portion 2*b* is arranged in the first housing portion 2*a*, and the female terminal 10 arranged inside can be viewed.

In the present embodiment, two terminal-equipped electric wires 4 are each mounted to the connector-equipped electric wire 1, and two female terminals 10 are adjacent in the arrangement space 2*c*.

The connector-equipped electric wire 1 thus configured constitutes, for example, an end of a wire harness (not illustrated) or an end of a branch line branched from the trunk line of the wire harness. A male connector (not illustrated) is connected to the connector-equipped electric wire 1 through the opening of the first housing portion 2*a*, and a male terminal provided in the male connector is connected to the female terminal 10 arranged in the arrangement space 2*c*.

The female terminal 10 connected to an exposed conductor at the tip of the electric wire 5, with the insulating covering stripped, constitutes the terminal-equipped electric wire 4.

The female terminal 10 is provided with the electric wire connecting portion 11 and a connecting portion 12. The connecting portion 12 has the base portion 20 and the spring member 30, which are assembled and conductively fixed to each other with a conductive welded portion 40 constituted by welding. Note that the electric wire connecting portion 11 and the base portion 20 constitute the terminal main body 15.

The electric wire connecting portion 11 and the connecting portion 12 are arranged in series in the female terminal 10. Note that in the following description, the direction in which the electric wire connecting portion 11 and the connecting portion 12 are arranged in series (the direction connecting the lower right and the upper left in FIG. 2) is defined as a length direction L. In addition, the direction that is orthogonal to the length direction L, and in which the electric wire connecting portion 11 is open (the direction connecting the lower left and the upper right in FIG. 2) is defined as a width direction W. Furthermore, the direction (up-down direction in FIG. 2) that intersects the length direction L and the width direction W is defined as a height direction H, with the direction in which an insertion space 12X is open (upward direction in FIG. 2) being an upward direction Hu, and its opposite direction (downward direction in FIG. 2) being a downward direction Hd.

The electric wire connecting portion 11 is constituted by a connection plate 111 extending in the length direction L and the height direction H, and a guide piece 112 extending from each of both ends in the height direction H of the connection plate 111 to one side in the width direction W. The electric wire connecting portion 11, which is constituted by a connection plate 111 and guide pieces 112, is formed in a rectangular U-shape lying sideways, with one side in the width direction W being opened as viewed from the length direction L. Note that in the present embodiment, there is formed a rectangular U-shape lying sideways in which the front side in the width direction W is opened.

The connecting portion 12, which is to be electrically connected to the connection blade 3 (see FIG. 4B) having a planar shape of the male terminal to be connected, comprises the base portion 20 having electrical conductivity, and the spring member 30 having electrical conductivity and arranged between a pair of side walls 21 in the base portion 20.

The base portion 20 comprises the pair of side walls 21 spaced apart by the insertion space 12X configured to be inserted with the connection blade 3, and a side wall coupling portion 22 coupling the side walls 21 to each other.

The spring member 30 arranged between the pair of side walls 21 comes into contact with the connection blade 3 inserted into the insertion space 12X so that a biasing force acts on the connection blade 3, with a reaction force by the side walls 21.

Specifically, the side walls 21 constituting the base portion 20 are arranged on one side of the electric wire connecting portion 11 in the length direction L, and are each formed in a planar shape in the length direction L and the height direction H. In addition, two side walls 21 constituting the base portion 20 are provided in the width direction W spaced apart by a predetermined interval. The side wall coupling portion 22 constituting the base portion 20 couples ends of the pair of side walls 21 on one side in the height direction H to each other in the width direction W as described above. The base portion 20 is formed in a U-shape as viewed from the length direction L, and is open in the upward direction Hu opposite to the side wall coupling portion 22 in the height direction H.

Additionally, one of the pair of side walls 21 is continuous with the connection plate 111 of the electric wire connecting portion 11 in the length direction L. Note that in the present embodiment, there is formed a U-shape in which the side wall 21 on the deep side in the width direction W is continuous with the connection plate 111, and that is open upward Hu in the height direction H.

Furthermore, of the guide pieces 112 arranged in the height direction H in the electric wire connecting portion 11, a part of the guide piece 112 in the downward direction Hd is continuous with the side wall coupling portion 22 in the base portion 20 in the length direction L.

At the end in the upward direction Hu in the height direction H of each of the pair of side walls 21, a mounting recess 23 is formed, which is recessed toward the downward direction Hd and on which a bridge coupling portion 33 (described later) of the spring member 30 is mounted.

Specifically, at both ends in the length direction L at the upper Hu end in the height direction H of the side wall 21, a regulating protrusion 24 protruding in the upward direction Hu is provided, respectively, and a portion between the regulating protrusions 24 at the end in the upward direction Hu of the side wall 21 is defined as the mounting recess 23.

Note that the regulating protrusion 24 comes into contact with the bridge coupling portion 33 (described later) mounted on the mounting recess 23, and can function as displacement prevention for preventing the spring member 30 with the bridge coupling portion 33 mounted on the mounting recess 23 from being displaced in the length direction L.

In addition, the base portion 20 is provided with a chamfered portion 25 having a corner chamfered, in the mounting recess 23 of the side wall 21. Specifically, as illustrated in the enlarged view of part a in FIG. 4A, of the end in the upward direction Hu of the side wall 21, a cross-sectional corner at the mounting recess 23 is chamfered into an inclined surface to form the chamfered portion 25.

Since the chamfered portion 25 is provided in the mounting recess 23, an inverted U-shaped spring 30*a* having a rectangular inverted U-shape and constituting the spring member 30 can be easily mounted on the mounting recess 23 as described later.

Additionally, with the chamfered portion 25 provided in the mounting recess 23, the heat for welding by the fiber laser welder 100 is concentrated. Thus, the bridge coupling portion 33 of the spring member 30 mounted on the mounting recess 23 can be reliably welded as described later, and degeneration of the spring member 30 due to the welding heat of the fiber laser welder 100 can be suppressed.

In the base portion 20 and the electric wire connecting portion 11 thus configured, the terminal plate material, which is a plate material made of conductive metal such as copper or copper alloy, is cut out into a predetermined shape and formed into the shape described above by bending.

Note that the terminal main body 15 constituted by the electric wire connecting portion 11 and the base portion 20 is composed of a thick plate with a predetermined thickness to cope with large current. The surface of the terminal main body 15 composed of a terminal plate material made of conductive metal such as oxygen-free copper, tough pitch copper, or various copper alloys is a non-plated member not subjected to plating treatment such as tin plating for improving electrical conductivity. Note that the entire surface of the terminal main body 15 may be a non-plated member that is not plated. For example, the electric wire connecting portion 11 or the like may be a partially plated member.

The spring member 30 is arranged between the pair of side walls 21 in the base portion 20. The spring member 30 comes into contact with the connection blade 3 (see FIG. 4B) inserted into the connecting portion 12 so that, with a reaction force by one of the side walls 21, a biasing force toward the other of the side walls 21 acts on the connection blade 3.

Specifically, the spring member 30 is constituted by two inverted U-shaped springs 30*a* each having a rectangular inverted U-shape and being open in the downward direction Hd as viewed from the length direction L. The two inverted U-shaped springs 30*a* are arranged in orientations opposite to each other in the width direction W, and are coupled to each other by coupling portions 34 at both ends in the length direction L to form a rectangular, substantially M-shape as viewed from the length direction L.

The inverted U-shaped spring 30*a* is constituted by a gripping plate 31, a plate spring 32, and the bridge coupling portion 33. The inverted U-shaped spring 30*a* is configured in a rectangular inverted U-shape, and is open in the downward direction Hd as viewed from the length direction L.

The gripping plate 31 is formed extending in the length direction L and the height direction H, and is arranged on the outer side in the width direction W. The plate springs 32 are arranged spaced apart at predetermined intervals on the inner side of the gripping plate 31 in the width direction W. The bridge coupling portion 33 connects the upper ends in the height direction H of the gripping plate 31 and the plate spring 32 to each other in the width direction W.

In addition, as illustrated in FIG. 3B, the plate spring 32 has a frame 321 that has an inverted rectangular U-shape and that is open in the downward direction Hd as viewed from the width direction W, and an arm spring 322 having a substantially inverted-V-shape as viewed from the length direction L.

The arm spring 322, which has a substantially inverted-V-shape as viewed from the length direction L, extends downward Hd in the height direction H from a length direction part 321*b* in the frame 321, and slopes inward in the width direction W downwardly Hd.

The frame 321 is formed, with up-down direction parts 321*a* and the length direction part 321*b*, in an inverted rectangular U-shape, and is open in the downward direction Hd as viewed from the width direction W.

The up-down direction parts 321*a* extend in the height direction H. The length direction part 321*b* couples, in the length direction L, ends in the upward direction Hu of the up-down direction parts 321*a* to each other, the ends being provided on both sides in the length direction L.

A plurality of arm springs 322 are arranged adjacent to each other in the length direction L. Note that the lower ends of the up-down direction parts 321*a* of the frames 321, which are located on the outer side in the length direction L of the plurality of arm springs 322 adjacent to each other, are coupled to each other by the coupling portion 34, whereby the inverted U-shaped springs 30*a* are coupled to each other in the width direction W. Note that the coupling portion 34 extends in the length direction L.

The interval in the width direction W between the gripping plate 31 and the plate spring 32 in the inverted U-shaped spring 30*a* is formed slightly wider than the thickness in the width direction W of the side wall 21. In addition, the interval in the width direction W between the inverted U-shaped springs 30*a*, that is, the interval in the width direction W between the plate springs 32 coupled to each other in the width direction W by the coupling portion 34, is formed slightly narrower than the interval between the side walls 21, that is, the length in the width direction W of the insertion space 12X.

Further, in the spring member 30, a part of the surface of the arm spring 322, such as the surface of the arm spring 322 to come into contact with the connection blade 3, is plated to improve electrical conductivity, by tin plating or the like. Of course, the entire surface of the spring member 30 may be plated.

The spring member 30 thus configured can be constructed using a material different from that of the terminal plate material composing the terminal main body 15, and can be constructed by cutting out into a predetermined shape and bending a plate material thinner than the terminal plate material and having high spring property. For the spring member 30, without limitation, Colson alloys, beryllium copper alloys, chromium copper alloys, or the like can be used, for example.

In addition, the spring member 30 is assembled to the base portion 20 described above from the side where the insertion space 12X is open, i.e., from upward Hu in the height direction H, and is conductively fixed to the base portion 20 with the conductive welded portion 40 extending in the length direction L.

Specifically, as illustrated in FIG. 6A, the assembling is performed such that the spring member 30 is arranged upward Hu in the height direction H of the base portion 20, the plate spring 32 and the coupling portion 34 are arranged in the insertion space 12X, the gripping plate 31 is arranged on the outer side in the width direction W of the side wall 21, and the bridge coupling portion 33 is arranged at the mounting recess 23 at the upper end of the side wall 21. At this point, the end in the upward direction Hu of the side wall 21 is sandwiched from both sides in the width direction W by the base of the arm spring 322, that is, the length direction part 321*b* of the frame 321, and the gripping plate 31.

Then, at parts where the mounting recess 23 part of the upper surface in the side wall 21 and the bridge coupling portion 33 overlap each other in the height direction H, welding and fixing are performed by moving the fiber laser welder 100 in the length direction L as illustrated in FIGS. 6B and 6C.

The conductive welded portion 40 is a weld bead welded by the fiber laser welder 100. The bridge coupling portion 33 and the upper end of the side wall 21 are fused and conductively connected and fixed to each other with the conductive welded portion 40.

Note that the fiber laser welder 100 for forming the conductive welded portion 40 has higher beam quality and higher power density than semiconductor laser welders and YAG laser welders in the related art. Thus, the conductive welded portion 40, which is a weld bead welded by the fiber laser welder 100, is welded at high speed with low thermal influence.

In this way, the female terminal 10 constituted by the connecting portion 12, which is obtained by assembling the base portion 20 to the spring member 30 and conductively connecting the base portion 20 to the spring member 30 with the conductive welded portion 40, and the electric wire connecting portion 11 to which the electric wire 5 is to be connected, can constitute the terminal-equipped electric wire 4 when the electric wire 5 is connected to the electric wire connecting portion 11 as described above, and can constitute the connector-equipped electric wire 1 when mounted on the connector housing 2.

Note that the above female terminal 10 can constitute the connector 7 by being arranged inside the connector housing 2.

When the male connector is connected to the connector-equipped electric wire 1, the connection blade 3 of the male terminal mounted on the male connector is inserted into the insertion space 12X from the opening side, as illustrated in FIG. 4B. The connection blade 3 inserted into the insertion space 12X is interposed between the arm springs 322 of the plate springs 32. The arm springs 322 can come into tight contact with the connection blade 3 with the biasing force in the width direction W applied, and conductively connect to the connection blade 3.

As described above, the female terminal 10 is provided with: the spring member 30 to be electrically connected to the connection blade 3 having a planar shape in the male terminal to be connected; and the terminal main body having the base portion 20, the base portion 20 having electrical conductivity and electrically connected to the spring member 30. The base portion 20 has the pair of side walls 21 spaced apart by the insertion space 12X configured to be inserted with the connection blade 3. The spring member 30 is arranged between the pair of side walls 21 in the base portion 20. The spring member 30 is fixed to the side wall 21 with the conductive welded portion 40 with which the spring member 30 is conductively welded to the side wall 21. The female terminal 10 can, while connected to the male terminal, bring the spring member 30 into tight contact with the connection blade 3 of the male terminal to reliably conduct electricity.

Specifically, a female terminal 10X is provided with: the spring member 30 to be electrically connected to the connection blade 3 having a planar shape of the male terminal to be connected; and the terminal main body 15. The terminal main body 15 has: the base portion 20 having electrical conductivity and electrically connected to the spring members 30; and the electric wire connecting portion 11 to be connected to the electric wire 5.

The base portion 20 has the pair of side walls 21 spaced apart by the insertion space 12X configured to be inserted with the connection blade 3. The spring member 30 is arranged between the pair of side walls 21 in the base portion 20 such that a biasing force acts from one side wall 21 toward the other side wall 21. Thus, the spring member 30 having electrical conductivity can be pressed against and brought into tight contact with the connection blade 3 of the male terminal inserted into the insertion space 12X, with a reaction force by the side walls 21.

Further, the spring member 30 is fixed to the side wall 21 with conductive welded portion 40 with which the spring member 30 is conductively welded to the side wall 21. Thus, for example, high electrical conductivity can be secured as compared to the electrical conductivity in the configuration where the terminal main body 15 and the spring member 30 are constructed as separate bodies, and merely brought into contact with each other.

Consequently, in the state of connection to the male terminal, the spring member 30, which is conductively fixed to the base portion 20, can be brought into tight contact with the connection blade 3 of the male terminal to reliably conduct electricity.

Specifically, in the case of a configuration in which the terminal main body 15 and the spring member 30 constructed as separate bodies are merely brought into contact with each other, the spring member 30 comes into contact and conducts electricity at two points: a point between the length direction part 321*b* of the frame 321 and the terminal main body 15, and a point between the arm spring 322 and the connection blade 3. Thus, it is necessary to increase the number of arm springs 322 and increase the contact points in order to secure predetermined electrical conductivity. However, as the number of arm springs 322 increases, the insertion force of the connection blade 3 into the female terminal 10 for connecting the female terminal 10 to the male terminal increases.

In contrast, in the case of the female terminal 10, the spring member 30 and the side wall 21 are electrically integrated with the conductive welded portion 40. Thus, in the state of connection to the male terminal, the female terminal 10 comes into contact and conducts electricity at only one point between the arm spring 322 and the connection blade 3, and electrical contact resistance is simply halved. Therefore, even when the number of arm springs 322 is reduced by half, comparable electrical conductivity can be secured. Note that in this case, the insertion force of the connection blade 3 into the female terminal 10 can be reduced.

Since the inverted U-shaped spring 30*a* constituting the spring member 30 is provided for each of the pair of side walls 21, the connection blade 3 of the male terminal inserted into the insertion space 12X can be sandwiched between and come into contact with the arm springs 322 of the inverted U-shaped springs 30*a*. Thus, the contact area between the connection blade 3 and the spring members 30 is increased, and electrical conductivity in the connection state between the female terminal 10 and the male terminal can be further improved.

In addition, the spring member 30 has a plurality of arm springs 322 arranged along the length direction L intersecting the height direction H, which is the depth direction in the insertion space 12X, each of the plurality of arm springs 322 having an arm shape and extending along the height direction H in the insertion space 12X. Thus, inserting the connection blade 3 into the insertion space 12X increases the contact area between the arm springs 322 having an arm shape and extending along the height direction H, and the connection blade 3, so that electrical conductivity in the connection state between the female terminal 10 and the male terminal can be more reliably improved without hindering insertion of the connection blade 3 into the insertion space 12X.

Additionally, since the conductive welded portion 40 is formed extending in the length direction L intersecting the height direction H, electrical conductivity between the spring member 30, which has a plurality of arm springs 322 arranged along the length direction L, and the base portion 20 can be improved.

Furthermore, the spring member 30 comprises the gripping plate 31 gripping the side wall 21 in cooperation with the length direction part 321*b* of the frame 321, which is the base of the arm springs 322. The gripping plate 31 is arranged on the outer side in the width direction W of the side wall 21. The bridge coupling portion 33, which couples the gripping plate 31 to the plate spring 32, is conductively welded to the side wall 21 with the conductive welded portion 40. Consequently, the spring member 30 having the arm springs 322 can be conductively fixed to the side wall 21.

Specifically, since the upper part of the side wall 21 is gripped by the length direction part 321*b*, which is the base of the arm springs 322, and the gripping plate 31, the spring member 30 having the arm springs 322 can be stably attached to the side wall 21. In addition, since the bridge coupling portion 33 is conductively welded and fixed to the side wall 21 with the conductive welded portion 40, welding workability is improved, and electrical conductivity between the arm spring 322 and the side wall 21 can be surely improved by reliable welding.

In the female terminal 10 in which the terminal main body 15, constituted by the base portion 20 and the electric wire connecting portion 11 integrated with each other, is composed of a thick plate material higher in electrical conductivity but lower in spring property than the spring member 30, the spring member 30 that reliably conducts electricity to the base portion 20 with the conductive welded portion 40 can be brought into tight contact with the connection blade 3 to further improve electrical conductivity.

Moreover, the terminal main body 15 is constituted by a non-plated member a surface of which is not plated. However, electrical conductivity of the spring member 30 with the side wall 21 of the base portion 20 can be secured with the conductive welded portion 40. As a result, when electrical conductivity is secured by contact between the side wall 21 and the spring member 30, high electrical conductivity can be secured without performing plating treatment or the like on the surface of the side wall 21 for improving electrical conductivity.

Note that in the above description, the bridge coupling portion 33 and the side wall 21 are melted by the fiber laser welder 100 to form the conductive welded portion 40 and conductively connected to each other. However, the conductive welded portion 40 may be formed by fusion welding such as arc welding, the conductive welded portion 40 may be formed by pressure welding such as resistance welding, ultrasonic welding, and friction welding, or the conductive welded portion 40 may be formed by brazing such as hard soldering and soldering.

Figure 7:
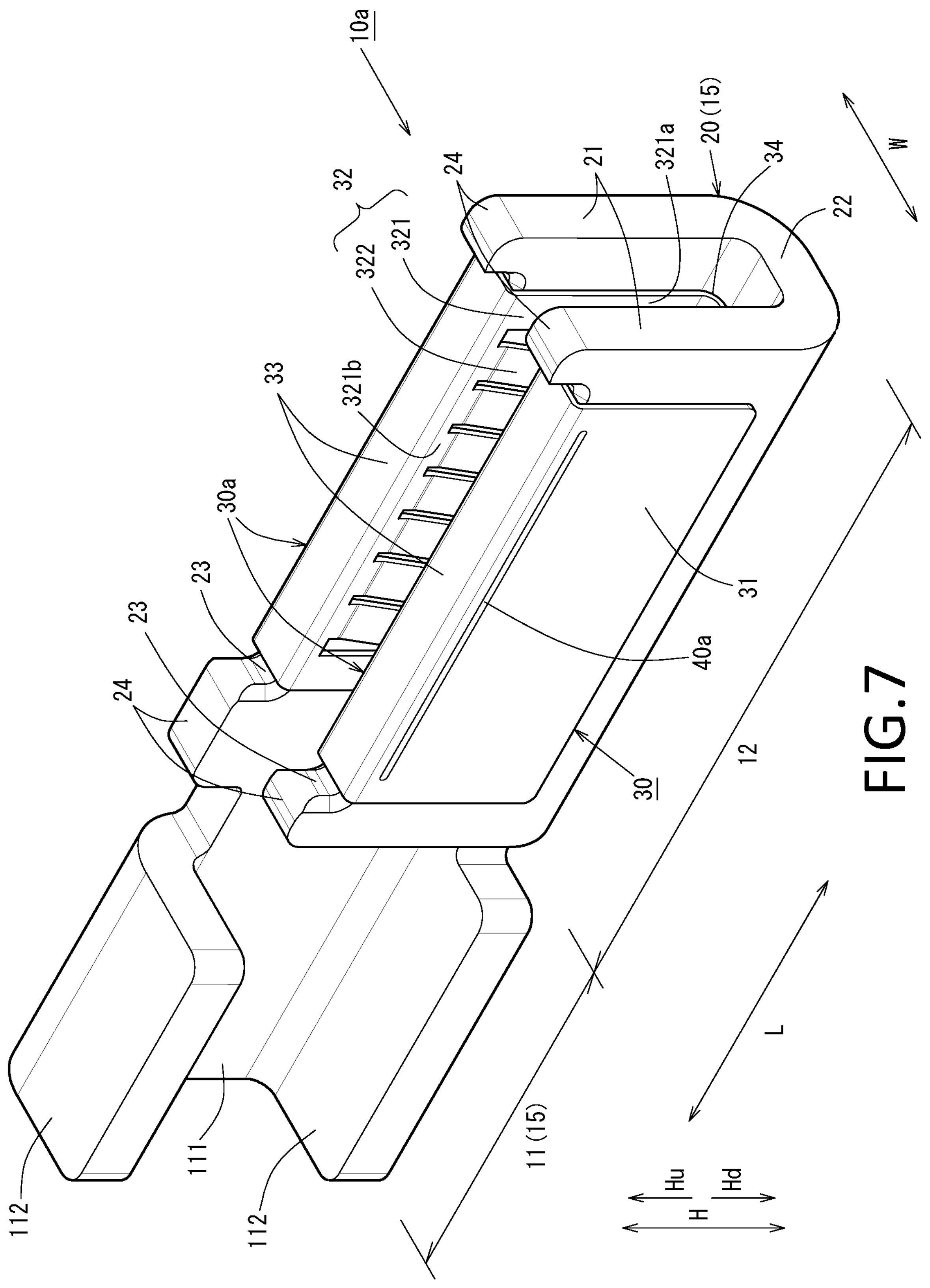
FIG. 7 is a perspective view of a variation of a female terminal.

In addition, the conductive welded portion 40 extending in the length direction L is formed at the bridge coupling portion 33. However, as illustrated in FIG. 7, a conductive welded portion 40*a* may be formed extending in the length direction L above the gripping plate 31. Note that FIG. 7 illustrates a perspective view of a female terminal 10*a* according to a variation. In FIG. 7, the same configurations as those in the female terminal 10 described above are denoted by the same reference signs, and their descriptions are omitted.

The female terminal 10*a* thus configured achieves effects similar to those of the female terminal 10 described above. Further, in the female terminal 10*a*, the gripping plate 31 is conductively welded to the side wall 21 by the conductive welded portion 40*a*, and thus the arm springs 322 can be fixed to the side wall 21.

Specifically, since the side wall 21 is gripped by the length direction part 321*b*, which is the base of the arm springs 322, and the gripping plate 31, the arm springs 322 can be stably attached to the side wall 21.

In addition, since the gripping plate 31, which is arranged on the outer side in the width direction W of the side wall 21, is conductively welded to the side wall 21, welding workability is improved, and electrical conductivity between the arm spring 322 and the side wall 21 can be surely improved by reliable welding.

Figure 8A:
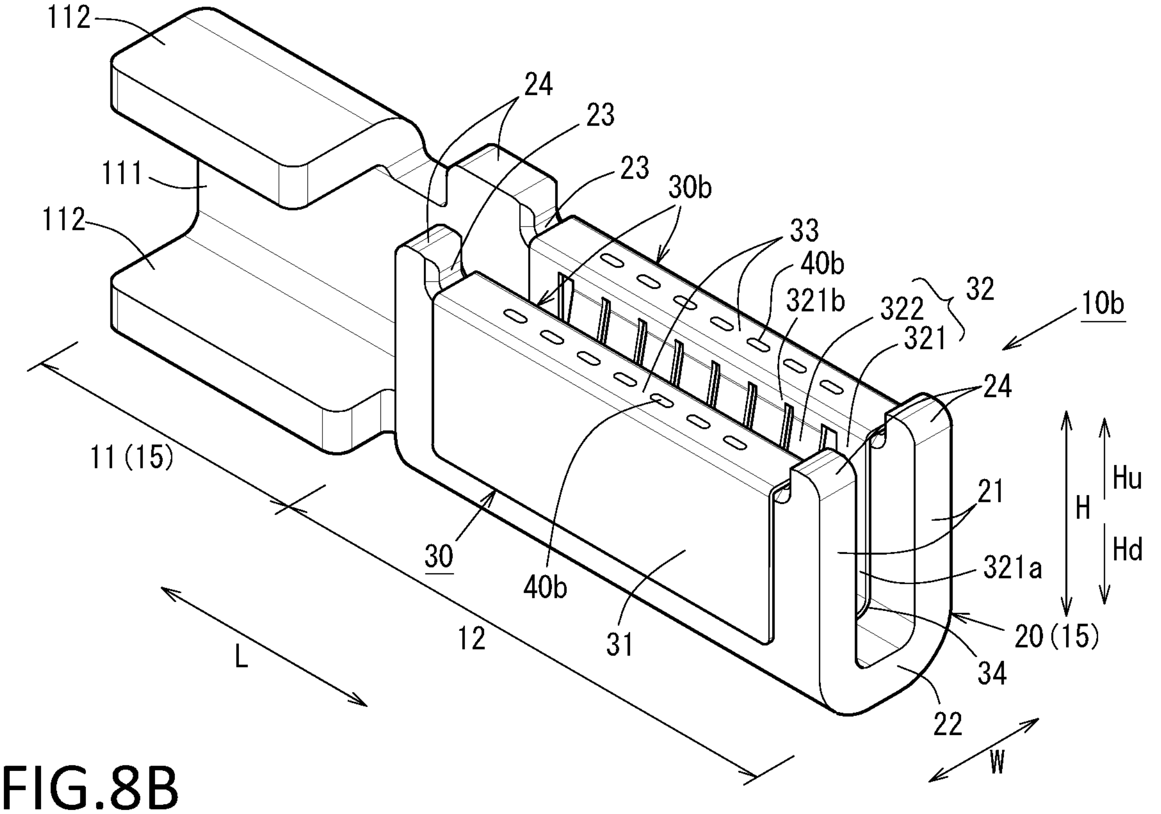
FIGS. 8A and 8B are perspective views of further variations of a female terminal.
Figure 8B:
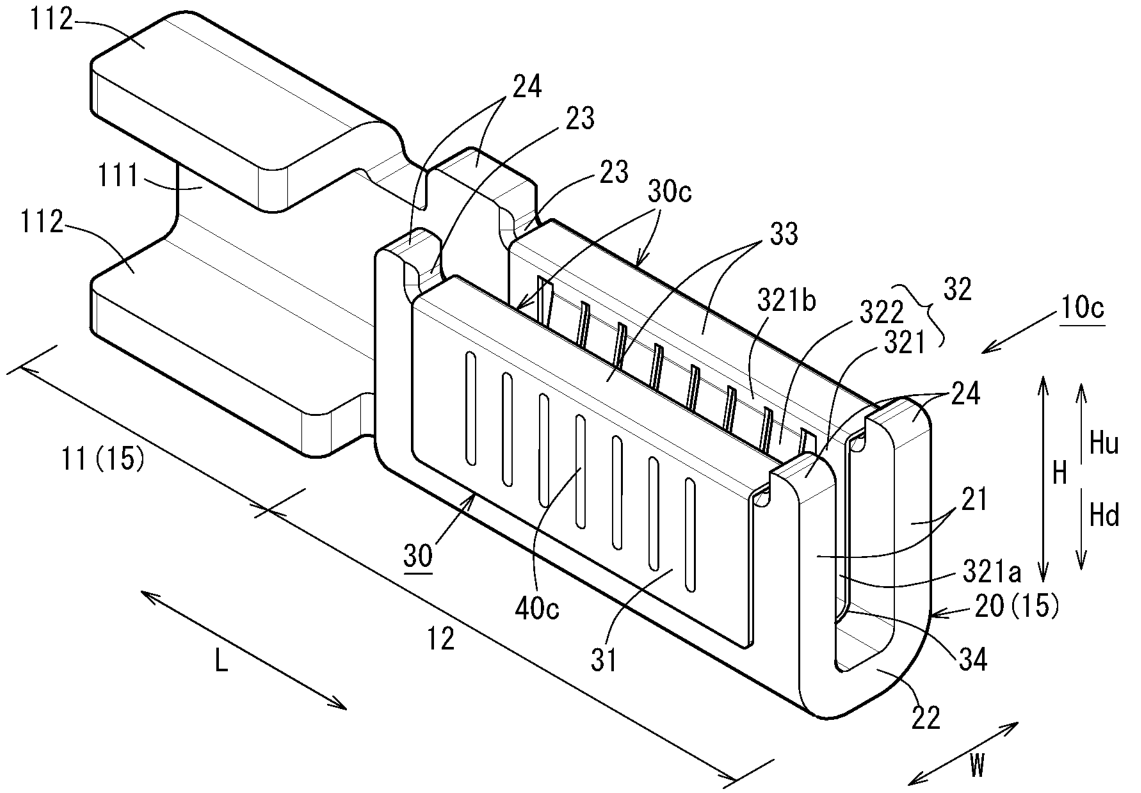

In addition, the conductive welded portion 40 is formed along the length direction L by the bridge coupling portion 33. However, a plurality of dot-shaped conductive welded portions 40*b* and line-shaped conductive welded portions 40*c* may be arranged along the length direction L as illustrated in FIGS. 8A and 8B. FIGS. 8A and 8B are explanatory views of the female terminals 10*b* and 10*c* according to further variations.

Note that FIG. 8A illustrates a perspective view of the female terminal 10*b* having a plurality of dot-shaped conductive welded portions 40*b*. FIG. 8B illustrates a perspective view of the female terminal 10*c* having a plurality of line-shaped conductive welded portions 40*c*.

In FIGS. 8A and 8B, the same configurations as those in the female terminal 10 described above are denoted by the same reference signs, and their descriptions are omitted.

Specifically, in the female terminal 10*b*, a plurality of dot-shaped conductive welded portions 40*b* are arranged spaced apart at predetermined intervals along the length direction L at the bridge coupling portion 33 of the spring member 30*b*.

Note that the dot-shaped conductive welded portions 40*b* are each arranged in a position corresponding to the center in the length direction L of the respective one of the arm springs 322, by the number of arm springs 322.

In the female terminal 10*b* thus configured, as with the female terminal 10, the bridge coupling portion 33 of the spring member 30*b* mounted on the side wall 21 is conductively welded to the side wall 21, so that welding workability is improved and electrical conductivity between the arm springs 322 and the side wall 21 can be surely improved by reliable welding.

Furthermore, in the female terminal 10*b*, the number of welded points between the spring member 30*b* and the side wall 21 by the dot-shaped conductive welded portions 40*b* increases as compared to that of the female terminal 10 described above. That is, the number of electrically conductive points between the side wall 21 and the spring member 30*b* by the dot-shaped conductive welded portions 40*b* increases. Thus, the arm springs 322 and the side wall 21 can constitute a so-called parallel circuit, the contact resistance between the spring member 30*b* and the side wall 21 can be reduced, and electrical conductivity can be improved.

In contrast, as illustrated in FIG. 8B, in the female terminal 10*c*, the gripping plate 31 of the spring member 30*c* is welded to the side surface of the side wall 21 with a plurality of line-shaped conductive welded portions 40*c*.

The line-shaped conductive welded portions 40*c* are weld beads extending in the height direction H, and as with the dot-shaped conductive welded portions 40*b* described above, are each arranged in a position corresponding to the center in the length direction L of the respective one of the arm springs 322, by the number of arm springs 322.

The female terminal 10*c* thus configured can achieve the effects achieved by the female terminal 10 and the female terminal 10*a* described above. For the female terminal 10*c*, as with the female terminals 10*b*, as described above, the number of welded points by the line-shaped conductive welded portions 40*c* between the spring member 30*c* and the side wall 21 increases as compared to that of the female terminal 10*a* described above. Therefore, in the female terminal 10*c*, the number of electrically conductive points between the side wall 21 and the spring member 30*c* by the line-shaped conductive welded portions 40*c* increases. Thus, the arm springs 322 and the side wall 21 can constitute a so-called parallel circuit, the contact resistance between the spring member 30*c* and the side wall 21 can be reduced, and electrical conductivity can be improved.

Furthermore, the line-shaped conductive welded portion 40*c* in the female terminal 10*c* can be formed to be longer than the dot-shaped conductive welded portion 40*b* in the female terminal 10*b*. Thus, the female terminal 10*c* can further improve electrical conductivity as compared to the female terminal 10*b* welded with dot-shaped conductive welded portions 40*b*.

Furthermore, in the female terminal 10 described above, the spring member 30 is used, in which the inverted U-shaped springs 30*a* are connected to each other in the width direction W with the coupling portions 34, and which is substantially M-shaped as viewed from the length direction L. In contrast, a separate spring member 30X may be used so that a spring member is mounted on each of the side walls 21, as in the female terminal 10X illustrated in FIGS. 9 and 10.

Figure 9:
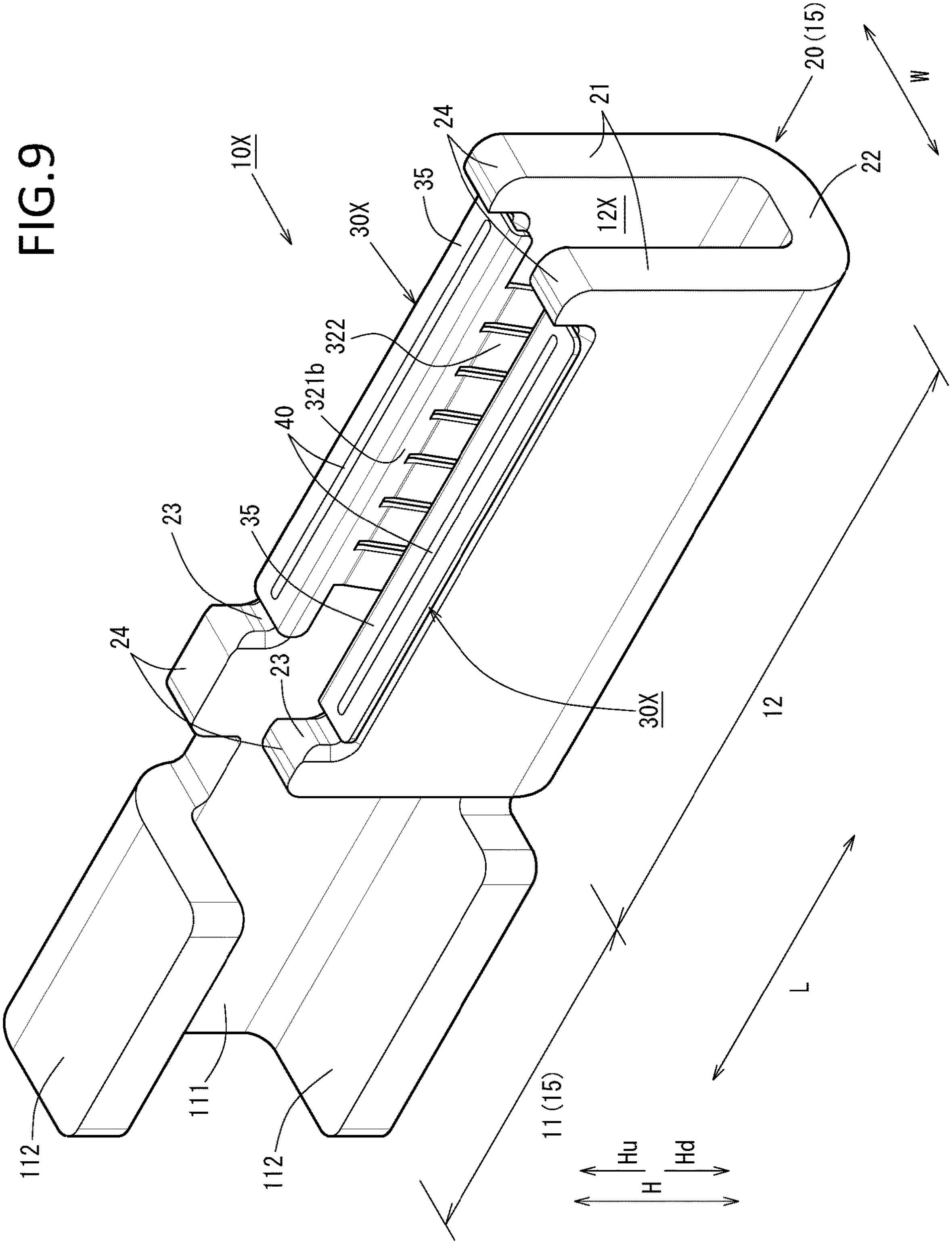
FIG. 9 is a perspective view of a female terminal according to a second embodiment.
Figure 10:
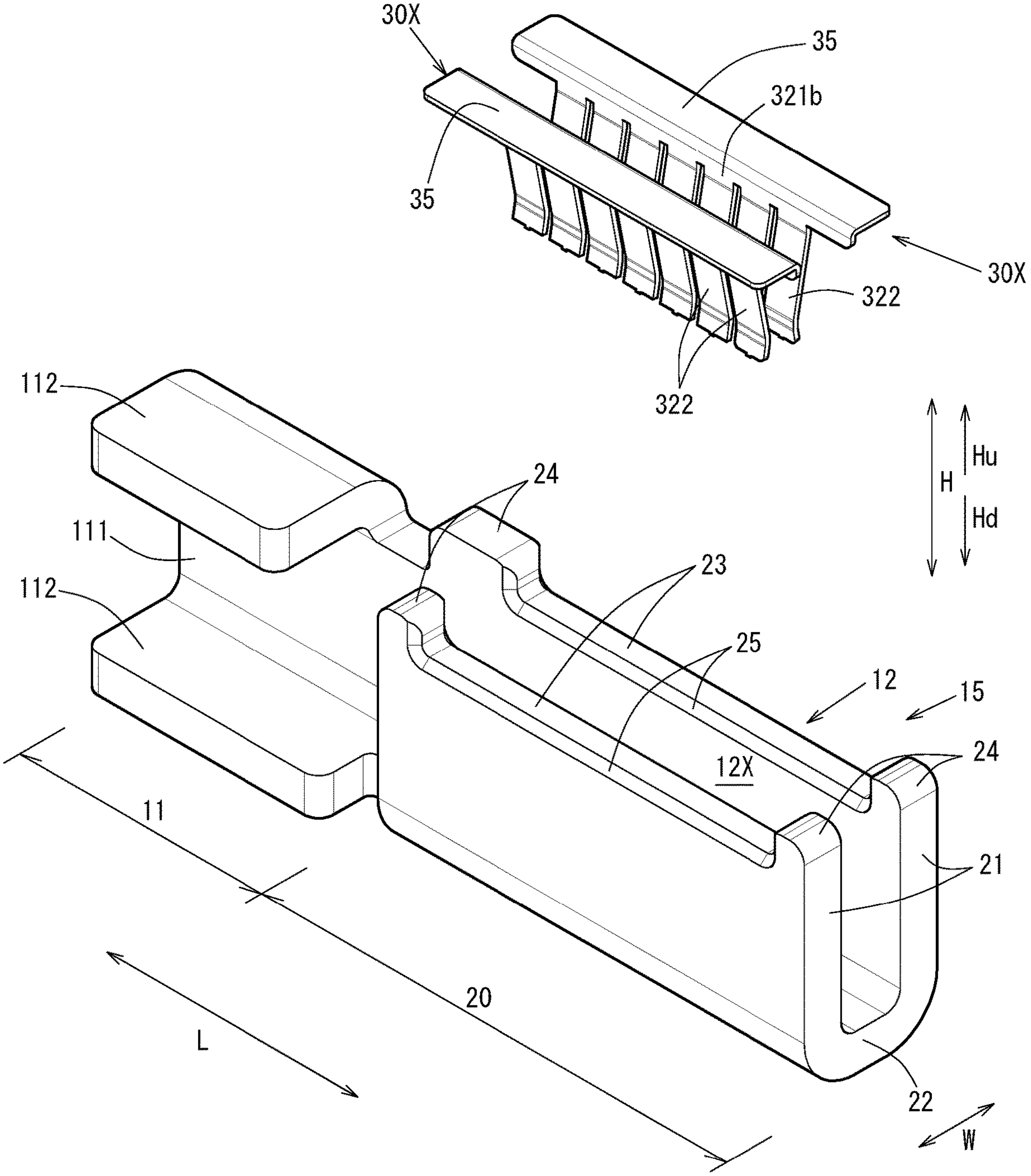
FIG. 10 is an exploded perspective view of the female terminal according to the second embodiment.

Note that FIG. 9 illustrates a perspective view of the female terminal 10X according to the second embodiment mounted with spring members 30X that are separate to each other. FIG. 10 illustrates an exploded perspective view of the female terminal 10X. In FIGS. 9 and 10, the same configurations as those in the female terminal 10 described above are denoted by the same reference signs, and their descriptions are omitted.

The spring member 30X used for the female terminal 10X is constituted by: only the length direction part 321*b*, and the portion of the arm springs 322 of the plate spring 32, in the inverted U-shaped spring 30*a* of the female terminal 10 described above; and a fixing plate 35 corresponding to the bridge coupling portion 33, and has a substantially inverted L-shape as viewed from the length direction L.

In the assembled state, the fixing plate 35 is a plate placed at the upper surface of the mounting recess 23 in the side wall 21, and is conductively fixed with the conductive welded portion 40 extending in the length direction L.

The two spring members 30X thus configured have orientations opposite to each other in the width direction W, and are each arranged at the upper end of the respective one of the side walls 21 and conductively fixed with the conductive welded portion 40, thereby constituting the female terminal 10X.

The female terminal 10X thus configured can achieve effects similar to those of the female terminal 10 described above.

Note that the spring members 30X may be coupled to each other in the width direction W to be integrated.

In addition, with the chamfered portion 25 provided in the mounting recess 23, the heat for welding by the fiber laser welder 100 is concentrated. Thus, the fixing plate 35 of the spring member 30X mounted on the mounting recess 23 can be reliably welded as described later, and degeneration of the spring member 30X due to the welding heat of the fiber laser welder 100 can be suppressed.

Note that in the female terminal 10X described above, the fixing plate 35 in the spring member 30X is placed at the mounting recess 23, and the spring member 30X is fixed to the side wall 21 with the conductive welded portion 40 extending in the length direction L. In contrast, the length direction part 321*b* in the spring member 30Xa may be fixed with a conductive welded portion 40X extending in the length direction L, as in the female terminal 10Xa illustrated in FIG. 11, and FIGS. 12A, 12B, and 12C.

Figure 11:
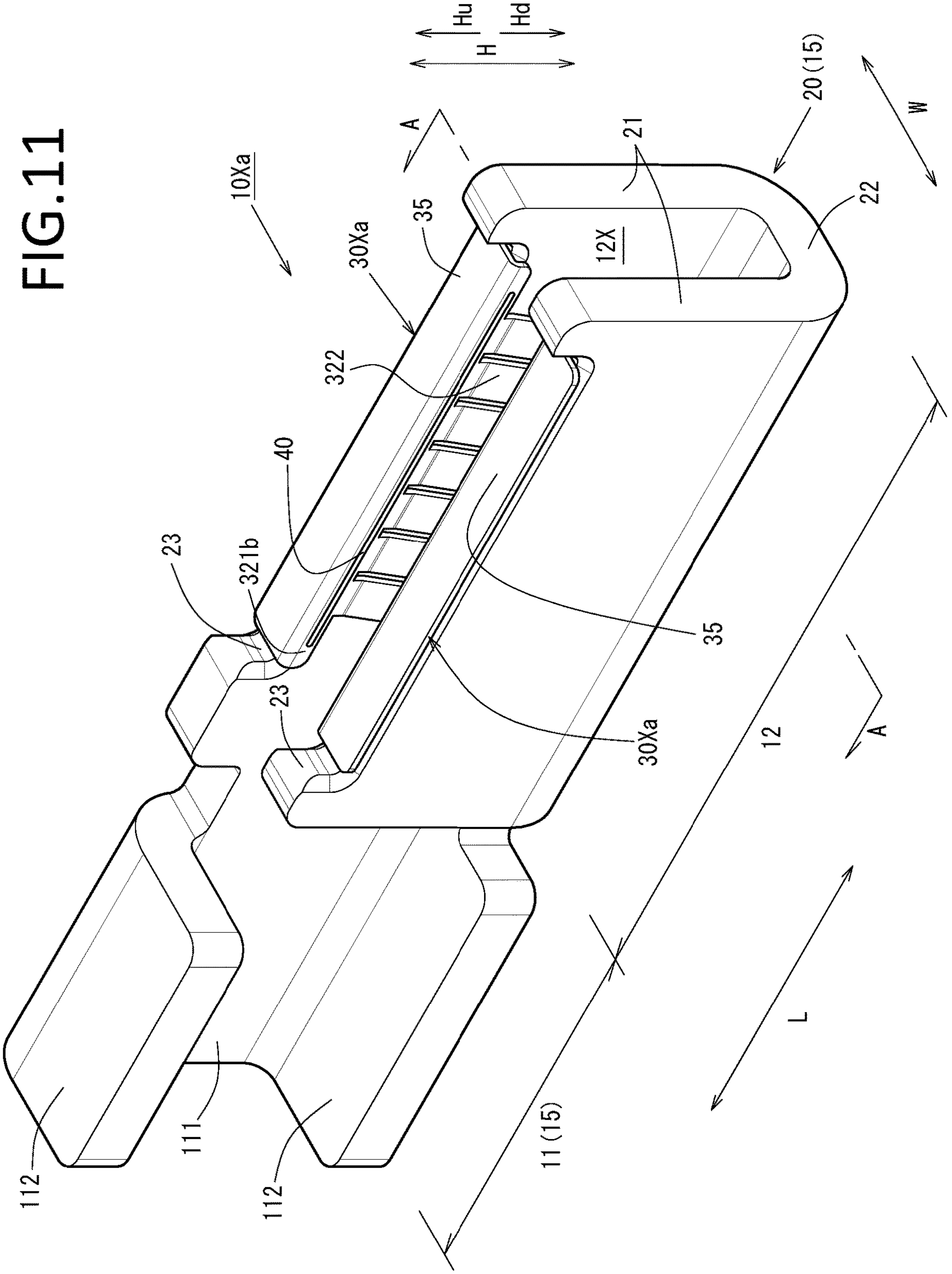
FIG. 11 is a perspective view of a female terminal according to a variation of the second embodiment.
Figures 12A, 12B, 12C:
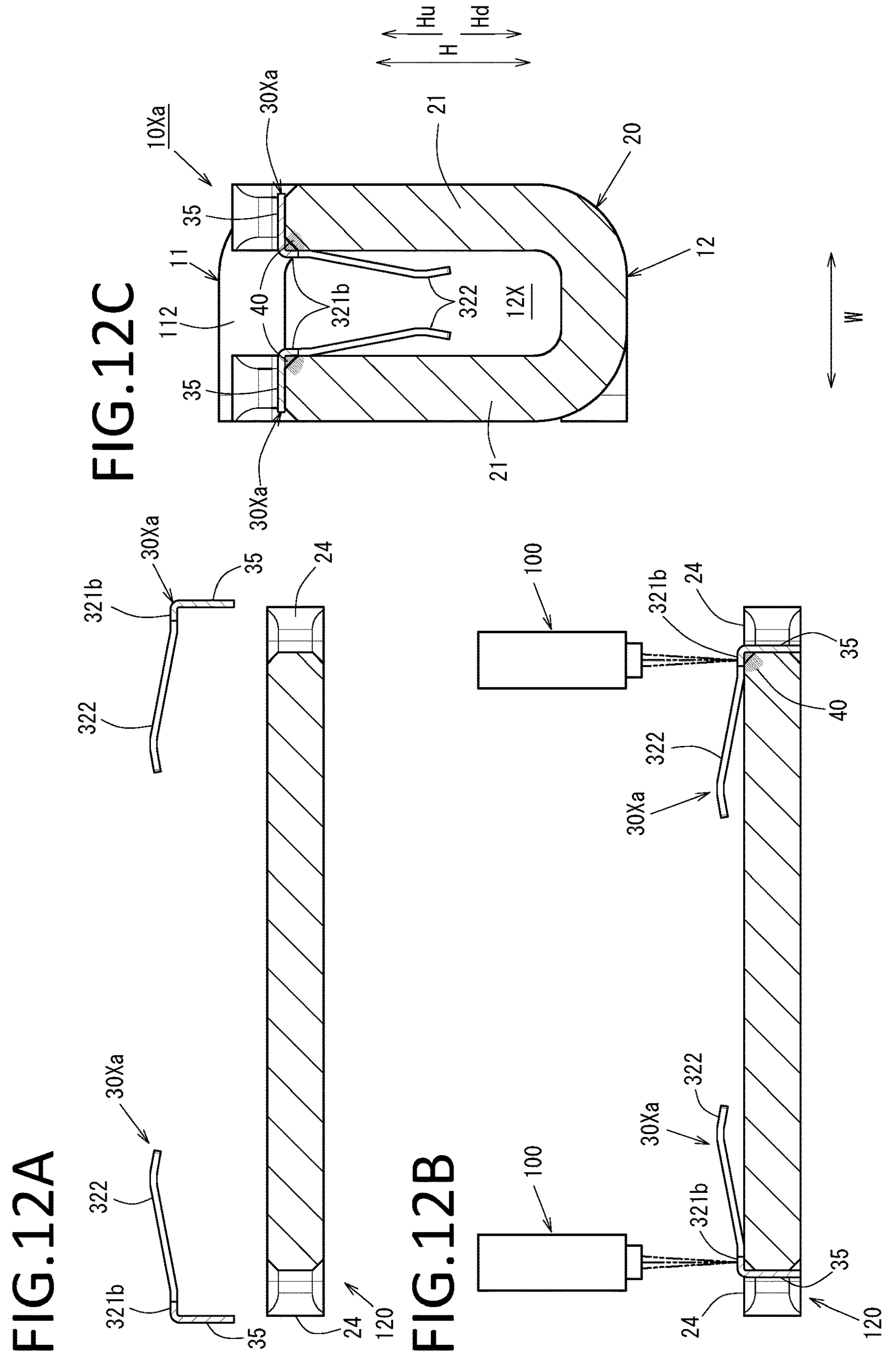
FIGS. 12A, 12B, and 12C are explanatory views of a female terminal according to a variation of the second embodiment.

FIG. 11 illustrates a perspective view of the female terminal 10Xa, which is a variation of the female terminal 10X described above. FIGS. 12A, 12B, and 12C illustrate explanatory views of the female terminal 10Xa.

Specifically, FIGS. 12A and 12B illustrate schematic views illustrating a manufacturing method of the base portion 20. FIG. 12C illustrates a view taken along the arrow A-A in FIG. 11.

In the female terminal 10Xa, only the welding points between the base portion 20 and the spring member 30Xa are different from those in the female terminal 10X described above, and the other configurations are the same as those of the female terminal 10X. Thus, in the following description, the same configurations are denoted by the same reference signs, and their descriptions are omitted.

In the female terminal 10Xa, the length direction part 321*b* in the spring member 30Xa is welded and fixed to the side surface near the upper end in the upward direction Hu of the side wall 21 in the length direction L, with the fixing plate 35 in the spring member 30Xa placed at the mounting recess 23. That is, in the female terminal 10Xa, the spring member 30Xa is welded and fixed to the inner side surface on the side of the insertion space 12X in the side wall 21.

As described above, in order to weld and fix the spring member 30Xa to the inner side surface on the side of the insertion space 12X in the side wall 21, the spring member 30Xa is set on the plate material 120 that is to form the base portion 20 constituted by the side wall 21 and the side wall coupling portion 22, as illustrated in FIG. 12A. Then, as illustrated in FIG. 12B, the fiber laser welder 100 is caused to scan the length direction part 321*b* in the spring member 30Xa set on the plate material 120 along the length direction L to perform laser welding, thereby forming the conductive welded portion 40.

A plate material 120, in which the side wall 21 and the spring member 30Xa are welded to each other by the fiber laser welder 100 and integrated, is bent into a predetermined cross-sectional shape, thereby forming the base portion 20 having the predetermined cross-sectional shape, as illustrated in FIG. 12C.

As described above, by welding and fixing the length direction part 321*b* of the spring member 30Xa to the plate material 120 having a plate shape, the spring member 30Xa can be securely welded to the inner side surfaces of the side walls 21 opposing each other in the width direction W, and effects similar to those of the female terminal 10X described above can be achieved.

Furthermore, in the female terminal 10 described above, the spring member 30 is used, in which the inverted U-shaped springs 30*a* are connected to each other in the width direction W with the coupling portions 34 on both sides in the length direction L, and which is substantially M-shaped as viewed from the length direction L. In contrast, a spring member 30Y coupled at an end in the length direction L may be used, such as a female terminal 10Y illustrated in FIGS. 13 to 15.

Figure 13:
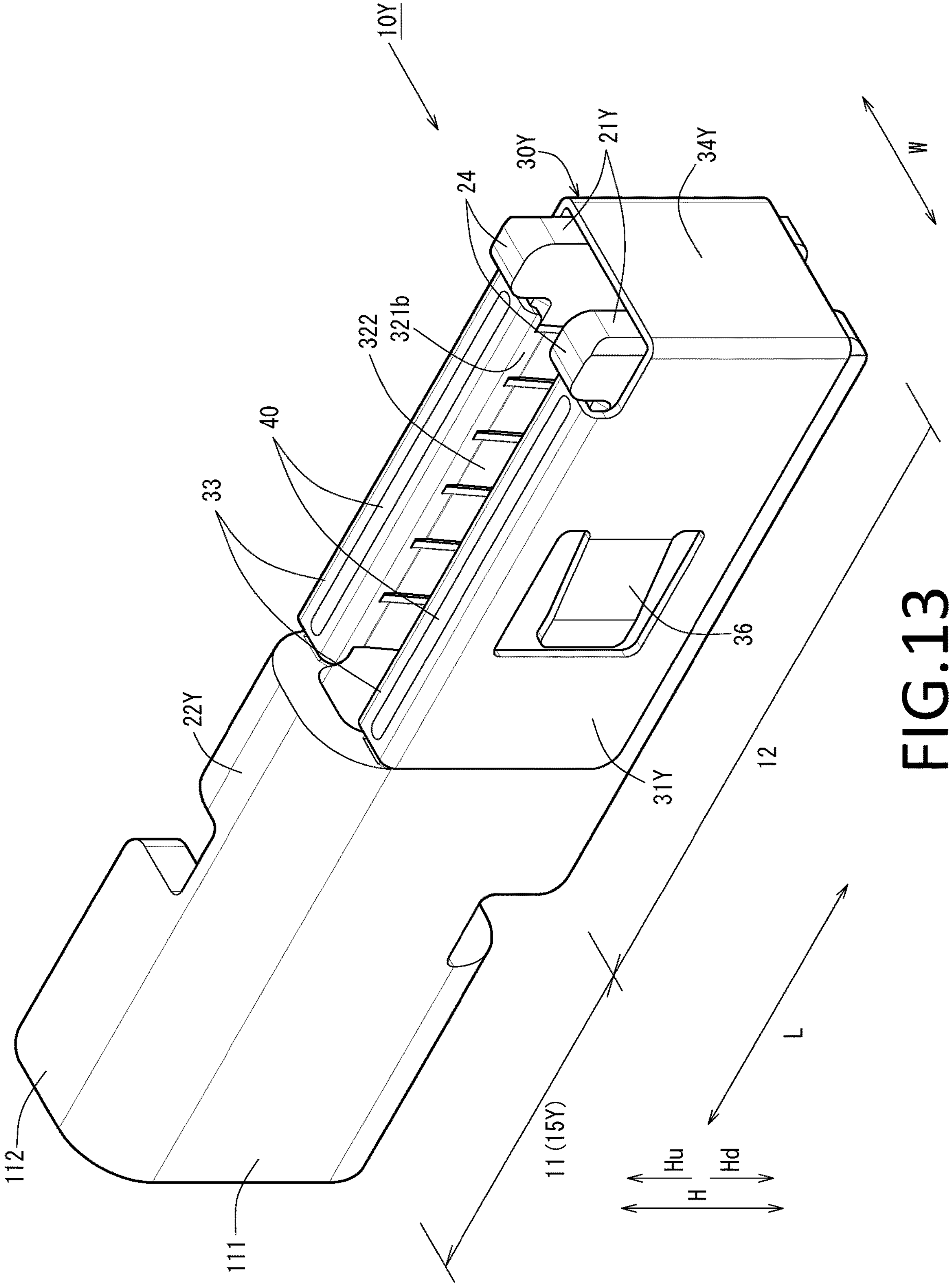
FIG. 13 is a perspective view of a female terminal according to a third embodiment.
Figure 14:
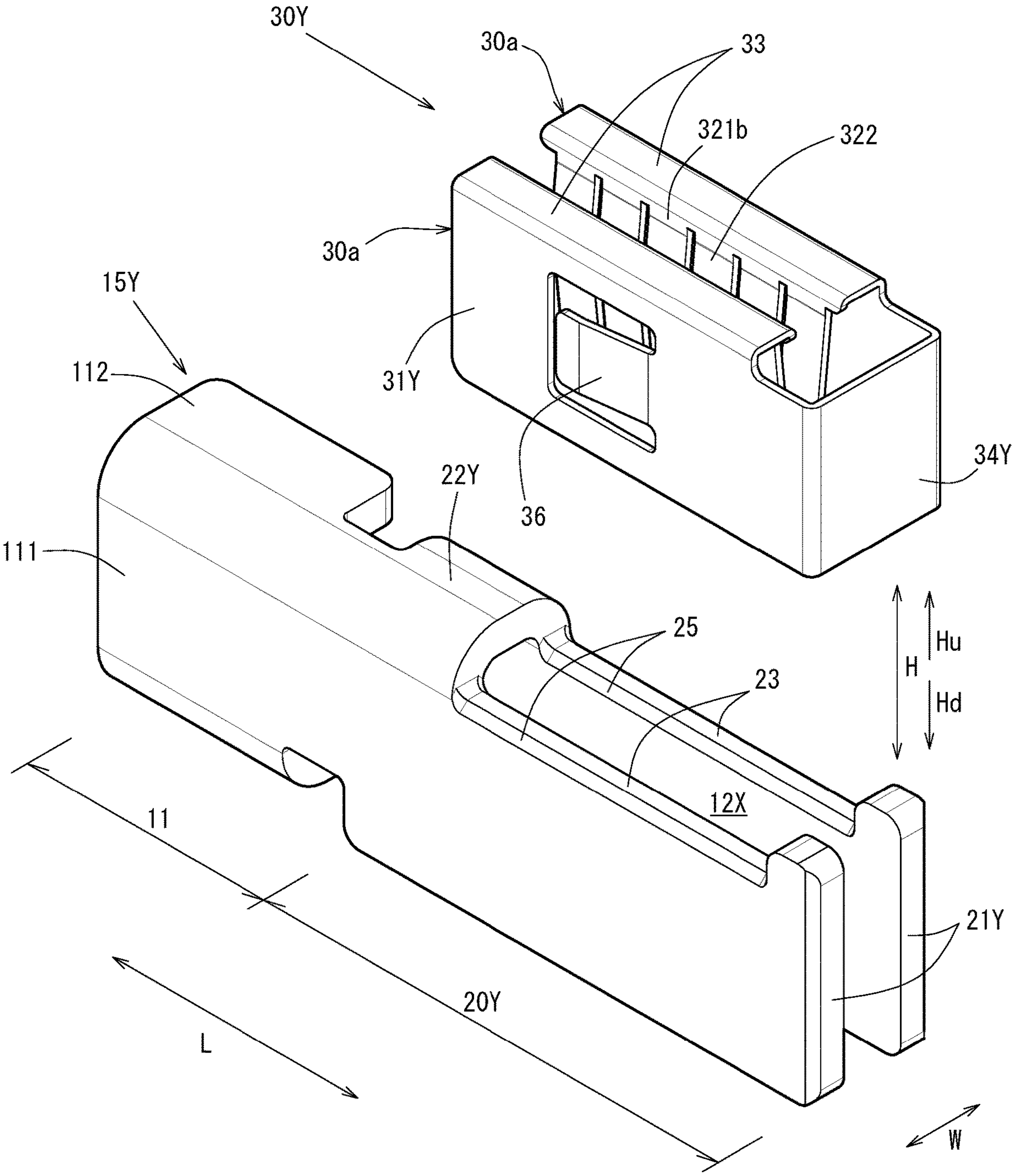
FIG. 14 is an exploded perspective view of the female terminal according to the third embodiment as viewed from above.
Figure 15:
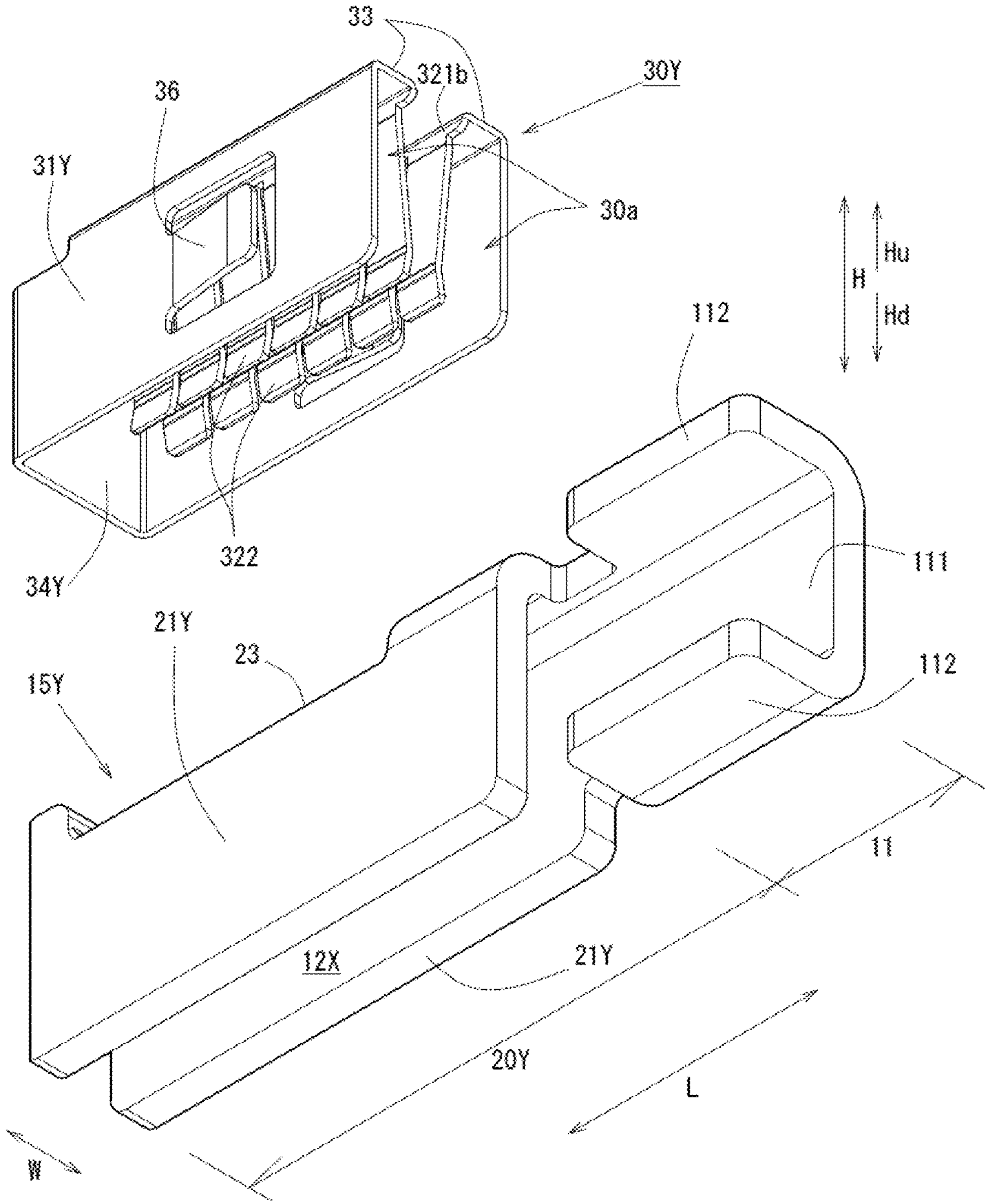
FIG. 15 is an exploded perspective view of the female terminal according to the third embodiment as viewed from below.

Note that FIG. 13 illustrates a perspective view of the female terminal 10Y according to a third embodiment mounted with the spring member 30Y. FIG. 14 illustrates an exploded perspective view of the female terminal 10Y as viewed from above. FIG. 15 illustrates an exploded perspective view of the female terminal 10Y as viewed from below. In FIGS. 13 to 15, the same configurations as those in the female terminal 10 described above are denoted by the same reference signs, and their descriptions are omitted.

In the terminal main body 15Y in the female terminal 10Y, the electric wire connecting portion 11 and the base portion 20Y are arranged in series in the length direction L. As with the electric wire connecting portion 11 in the female terminal 10, the electric wire connecting portion 11 is formed, with the connection plate 111 and the guide pieces 112, in a rectangular C-shape as viewed from the length direction L. However, the electric wire connecting portion 11 in the present embodiment is open in a direction different from that of the electric wire connecting portion 11 in the female terminal 10.

The base portion 20 is formed in a substantially U-shape as viewed from the length direction L, where the lower ends of the pair of side walls 21 are coupled to each other in the width direction W with the side wall coupling portion 22. In contrast, the base portion 20Y comprises a pair of side walls 21Y, but the side walls 21Y are coupled to each other with a side wall coupling portion 22Y at the upper portion on the electric wire connecting portion 11 side in the length direction L. Thus, the insertion space 12X formed between the side walls 21Y is a space where both sides in the height direction H and the tip side in the length direction L are opened.

Further, at the upper end on the tip side in the length direction L of the side wall 21Y, a regulating protrusion 24 protruding in the height direction H is provided. Between the side wall coupling portion 22Y and the regulating protrusions 24, the mounting recess 23 on which the bridge coupling portion 33 of the spring member 30Y is to be mounted is formed.

In addition, the chamfered portion 25 is formed at the corner of the mounting recess 23 of the side wall 21Y.

The spring member 30Y used for the female terminal 10Y is configured in a substantially rectangular U-shape as viewed from the height direction H, in which one ends in the length direction L of the gripping plates 31Y in the inverted U-shaped spring 30*a* are coupled to each other in the width direction W with the coupling portion 34Y.

Note that near the center of the gripping plate 31Y, a clip portion 36 is comprised which, while mounted on the base portion 20Y, assist in fixation of the spring member 30Y to the base portion 20 by exerting a pressing force on the outer surface of the side wall 21Y. The clip portion 36 may also be provided at the gripping plate 31 of the spring member 30 in the female terminal 10 described above.

The spring member 30Y thus configured is mounted on the mounting recess 23 formed at the upper surface of the pair of side walls 21Y from upward Hu in the height direction H, and is conductively fixed with the conductive welded portion 40 to constitute the female terminal 10Y. Note that in this mounted state, the coupling portion 34Y is mounted straddling the end side surfaces of the side walls 21Y.

The female terminal 10Y thus configured can achieve effects similar to those of the female terminal 10 described above.

In addition, the spring member 30Y mounted from the upward direction Hu to the mounting recess 23 can be prevented by the side wall coupling portion 22Y and the regulating protrusions 24 from being displaced in the length direction L. In other words, of the regulating protrusions 24 and the side wall coupling portion 22Y provided on both sides in the length direction L of the mounting recess 23, the side wall coupling portion 22Y couples the upper portions of the electric wire connecting portion 11 to each other, and can function, in cooperation with the regulating protrusions 24, as displacement prevention for the spring member 30Y mounted on the mounting recess 23.

Note that as in the above base portion 20Y, the base portion need not be configured in a U-shape as viewed from the length direction L as in the above base 20, and can have various configurations as long as a pair of side walls 21 forming the insertion space 12X are comprised. For example, a configuration may be adopted in which a pair of side walls 21 along the length direction L and the width direction W oppose each other in the height direction H in the base portion, and the connection blade 3 is inserted from the tip side in the length direction L. Even with this configuration, effects similar to those of the female terminal 10 described above can be achieved.

Next, a female terminal 10Ya of a variation using the spring member 30Y in the female terminal 10Y described above will be described together with FIGS. 16A and 16B, and FIG. 17.

Figure 16A:
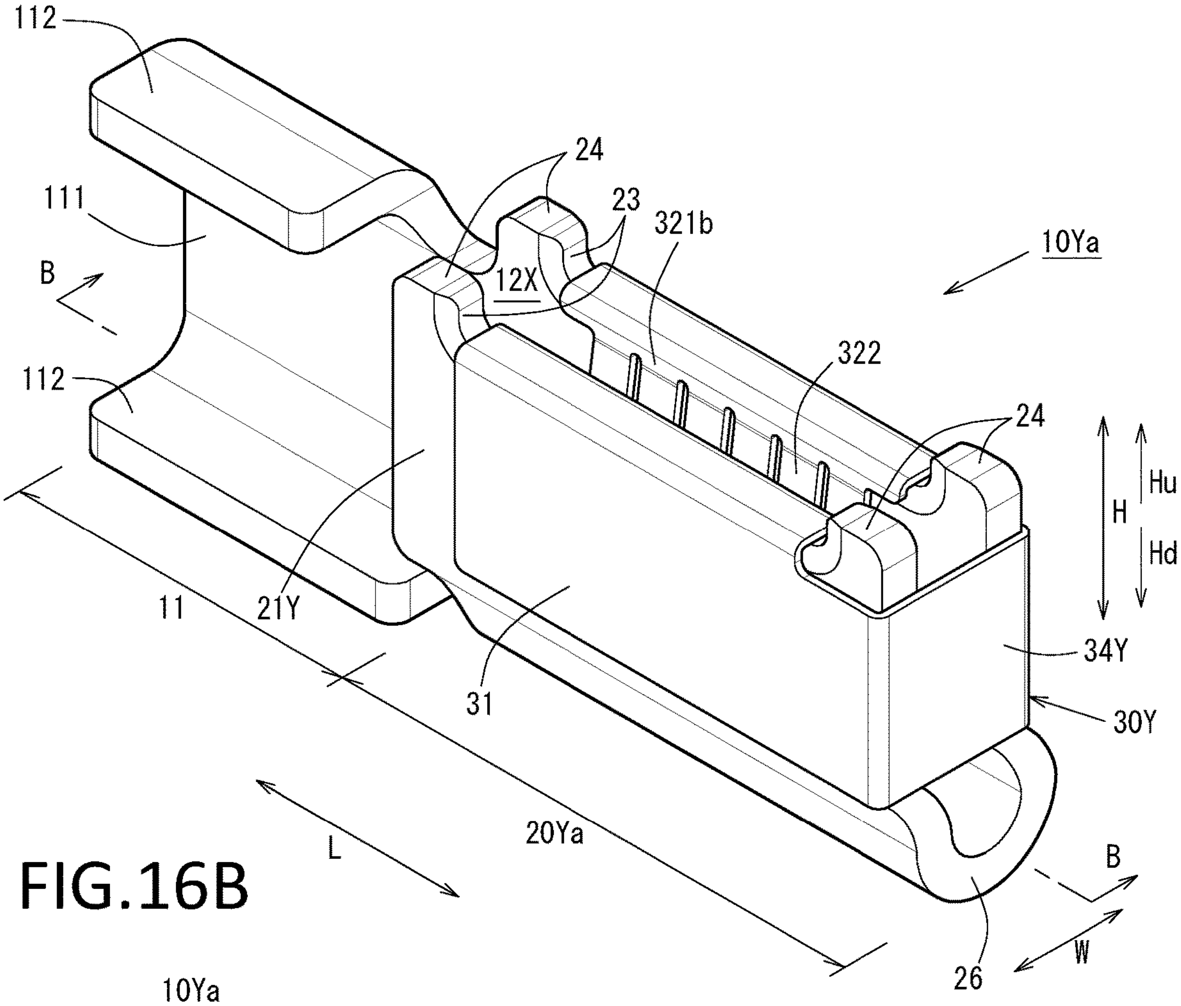
FIGS. 16A and 16B are explanatory views of a variation of the female terminal according to the third embodiment.
Figure 16B:
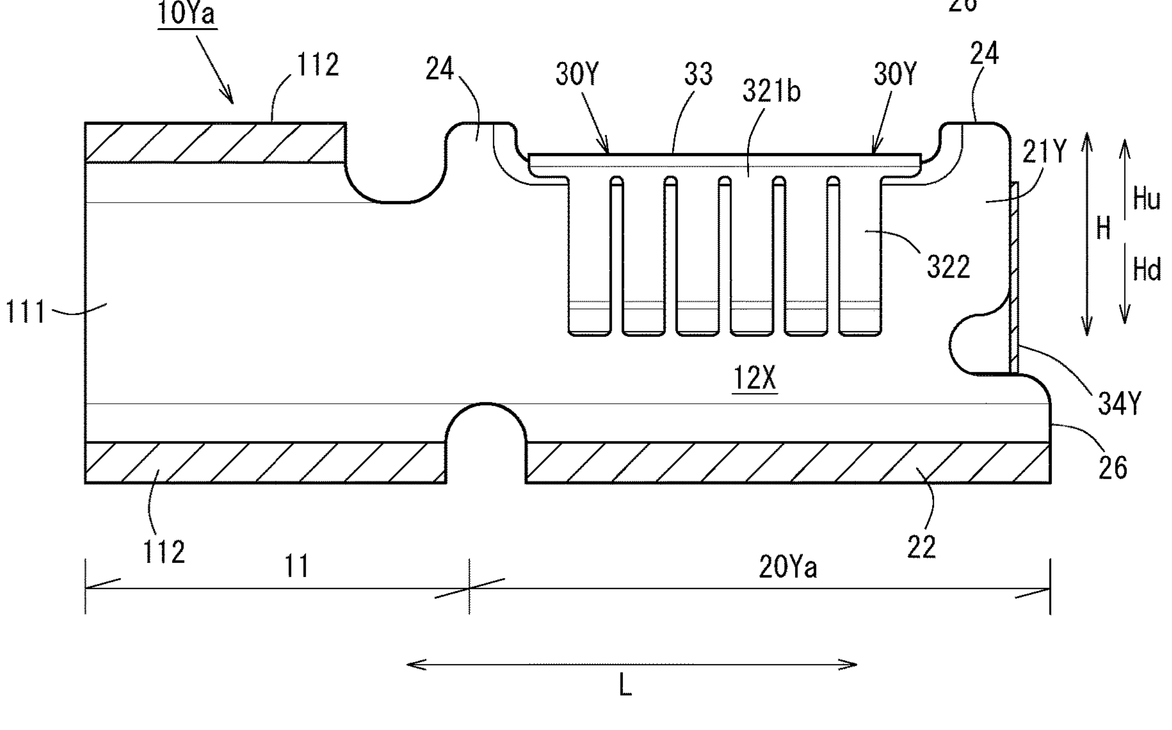
Figure 17:
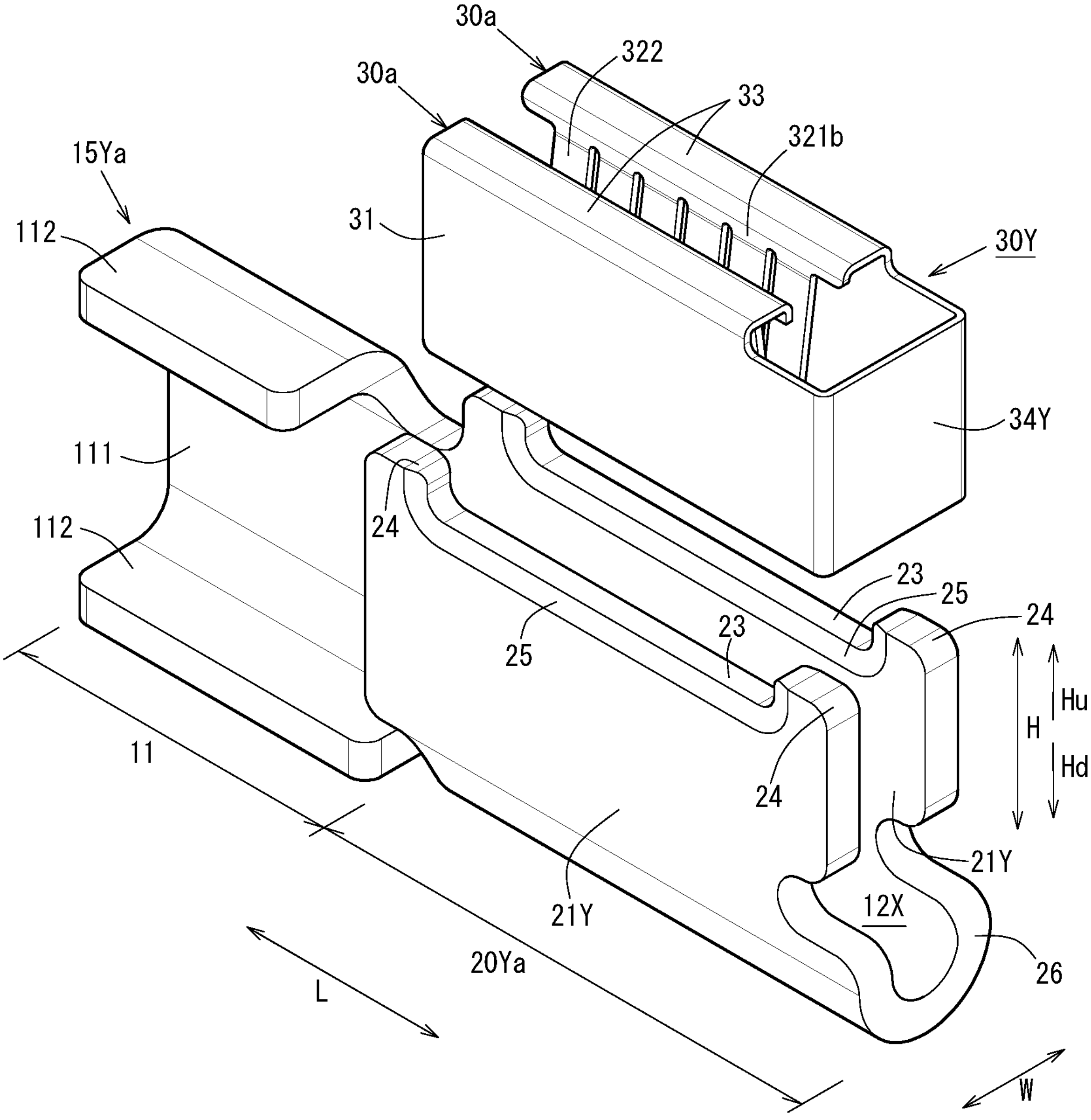
FIG. 17 is an exploded perspective view of a variation of the female terminal according to the third embodiment.

Note that FIGS. 16A and 16B illustrate explanatory views of the female terminal 10Ya of a variation. Specifically, FIG. 16A illustrates a perspective view of the female terminal 10Ya. FIG. 16B illustrates a cross-sectional view taken along the arrow B-B in FIG. 16A. FIG. 17 illustrates an exploded perspective view of the female terminal 10Ya.

The female terminal 10Ya has the same configuration as that of the terminal main body 15 in the female terminal 10 described above, and further comprises the terminal main body 15Ya having a tip protrusion 26 obtained by causing the side wall coupling portion 22 in the base portion 20Ya to extend to the tip side in the length direction L. Note that the same configurations as those in the female terminal 10 described above are denoted by the same reference signs, and their descriptions are omitted.

The tip protrusion 26, which is obtained by causing the side wall coupling portion 22 to extend to the tip side in the length direction L, has an arc shape protruding in the downward direction Hd as viewed from the length direction L, and a step is formed between the side surface on the tip side of the side wall 21 and the tip protrusion 26.

When the spring member 30Y is mounted on the base portion 20Ya thus configured with the bridge coupling portion 33 mounted on the mounting recess 23 between the regulating protrusions 24, the coupling portion 34Y is mounted lying along the side surface on the tip side of the side wall 21Y.

Thus, the end in the downward direction Hd of the coupling portion 34Y in the spring member 30Y is in a state of being placed at or close to the upper surface of the tip protrusion 26, the tip protrusion 26 being stepped from the side surface on the tip side of the side wall 21.

Consequently, in the female terminal 10Ya, the spring member 30Y in which the bridge coupling portion 33 is mounted on the mounting recess 23 can be prevented by the regulating protrusions 24 from being displaced in the length direction L. In addition, the end in the downward direction Hd of the coupling portion 34Y comes into contact with the upper surface of the tip protrusion 26 and thus can be prevented from being displaced in the downward direction Hd.

Note that in the female terminal 10X described above, each of the side walls 21 comprises the spring member 30X. In contrast, only one of the side walls 21 may comprise the spring member 30X, as in a variation of the female terminal 10X illustrated in FIGS. 18A and 18B, and FIG. 19. In this case, electrical conductivity between the connection blade 3 and the female terminal 10X is reduced as compared to that of the female terminal 10X in which both side walls 21 each comprise the spring member 30X, but the other effects can be similarly achieved.

Figure 18A:
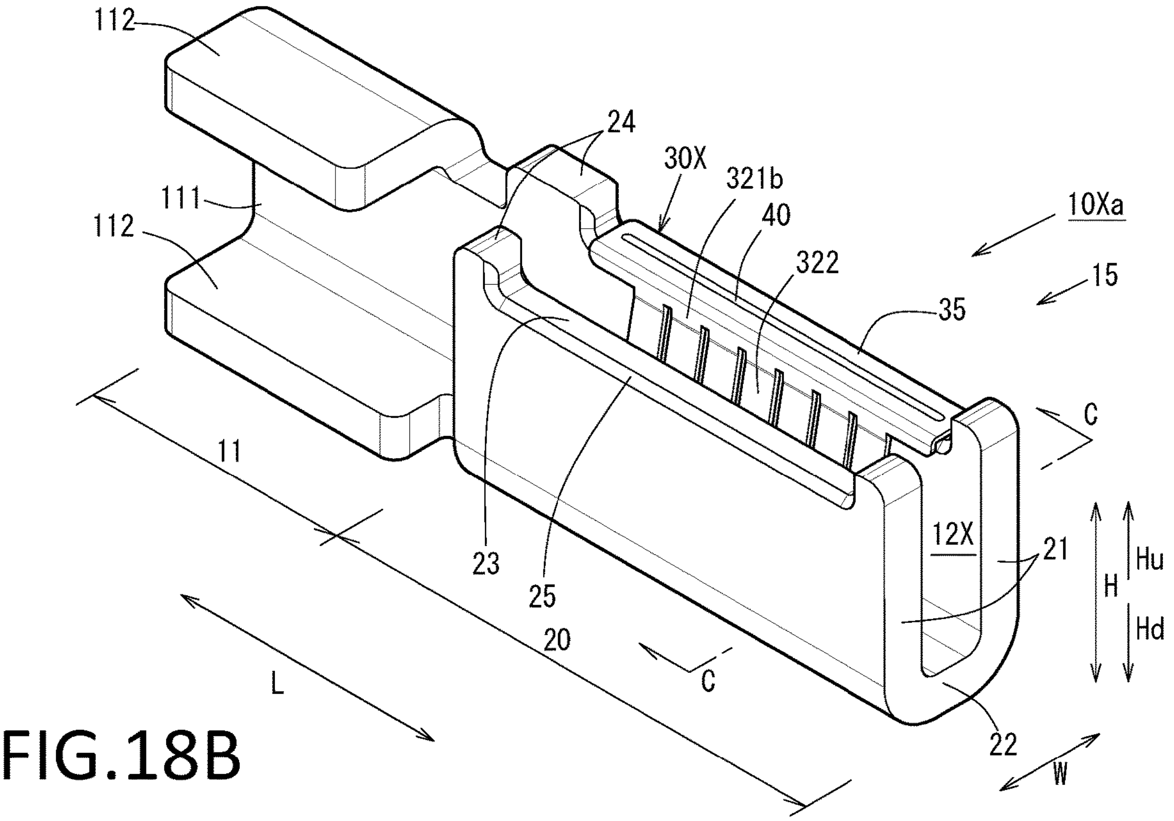
FIGS. 18A and 18B are explanatory views of a variation of the female terminal according to the second embodiment.
Figure 18B:
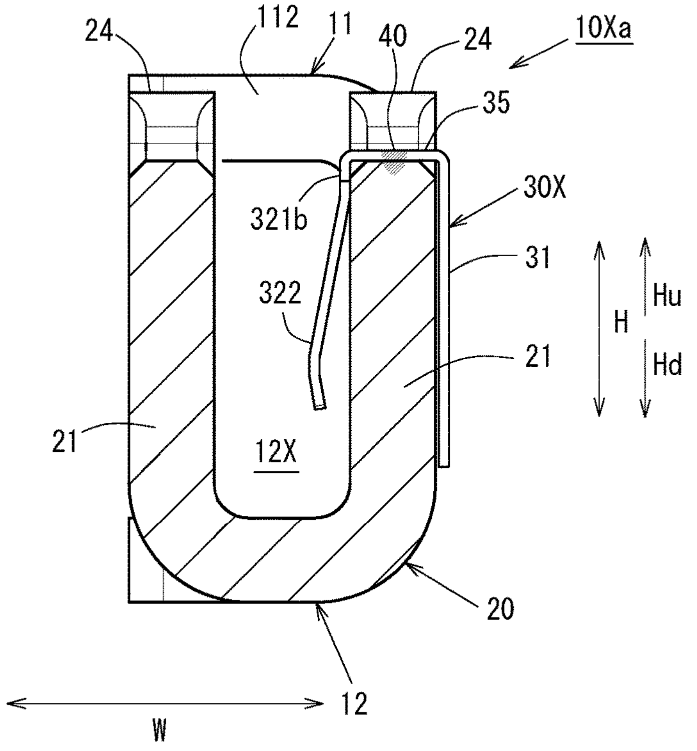
Figure 19:
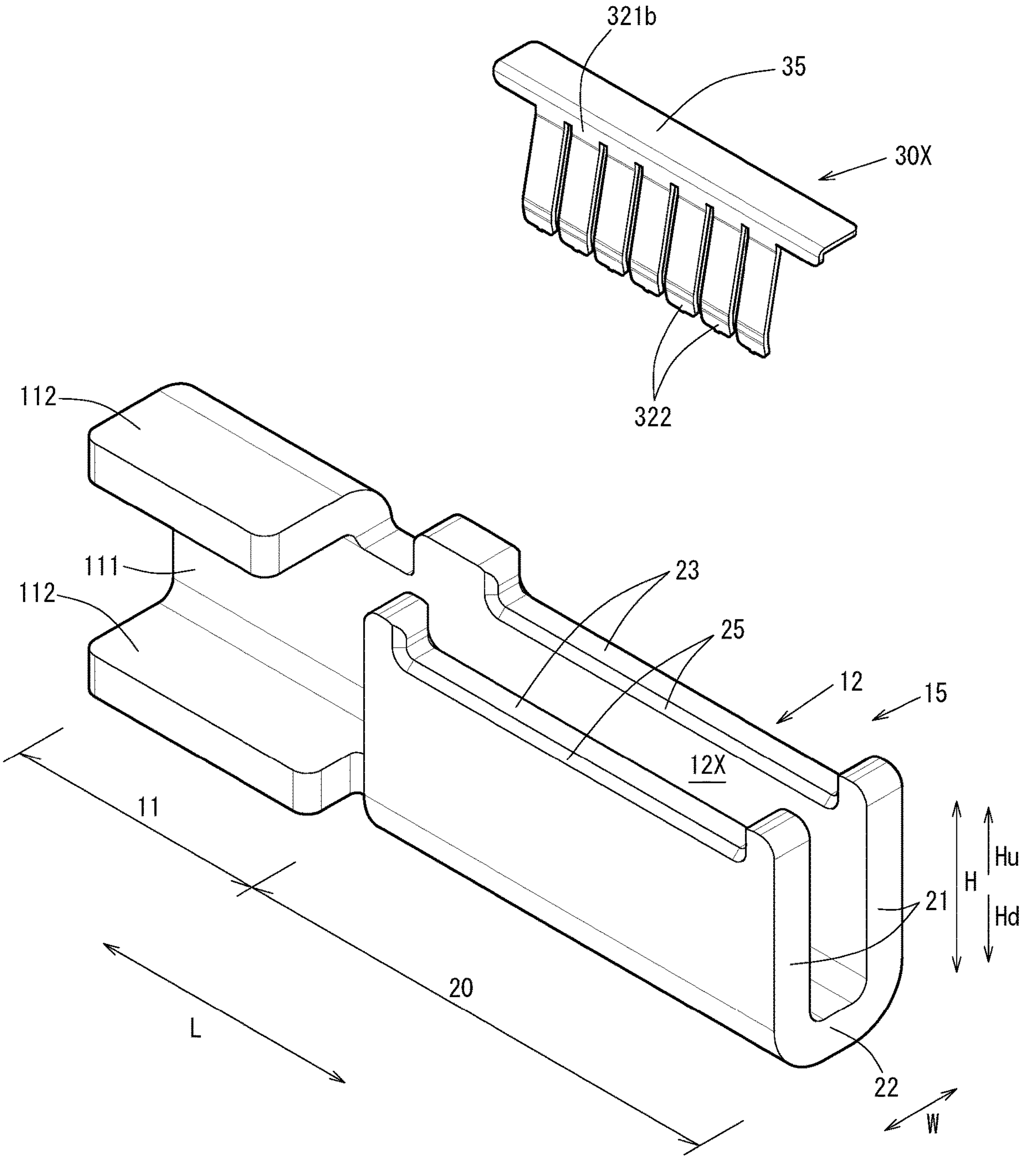
FIG. 19 is an exploded perspective view of a variation of the female terminal according to the second embodiment.

Note that FIGS. 18A and 18B illustrate explanatory views of a variation of the female terminal 10X. FIG. 19 illustrates an exploded perspective view of the variation of the female terminal 10X.

Specifically, FIG. 18A illustrates a perspective view of the variation of the female terminal 10X. FIG. 18B illustrates a cross-sectional view taken along the arrow C-C in FIG. 18A.

Next, a female terminal 10Xb, which is a further variation of the female terminal 10X, will be described together with FIGS. 20A and 20B, and FIGS. 21A and 21B.

Figure 20A:
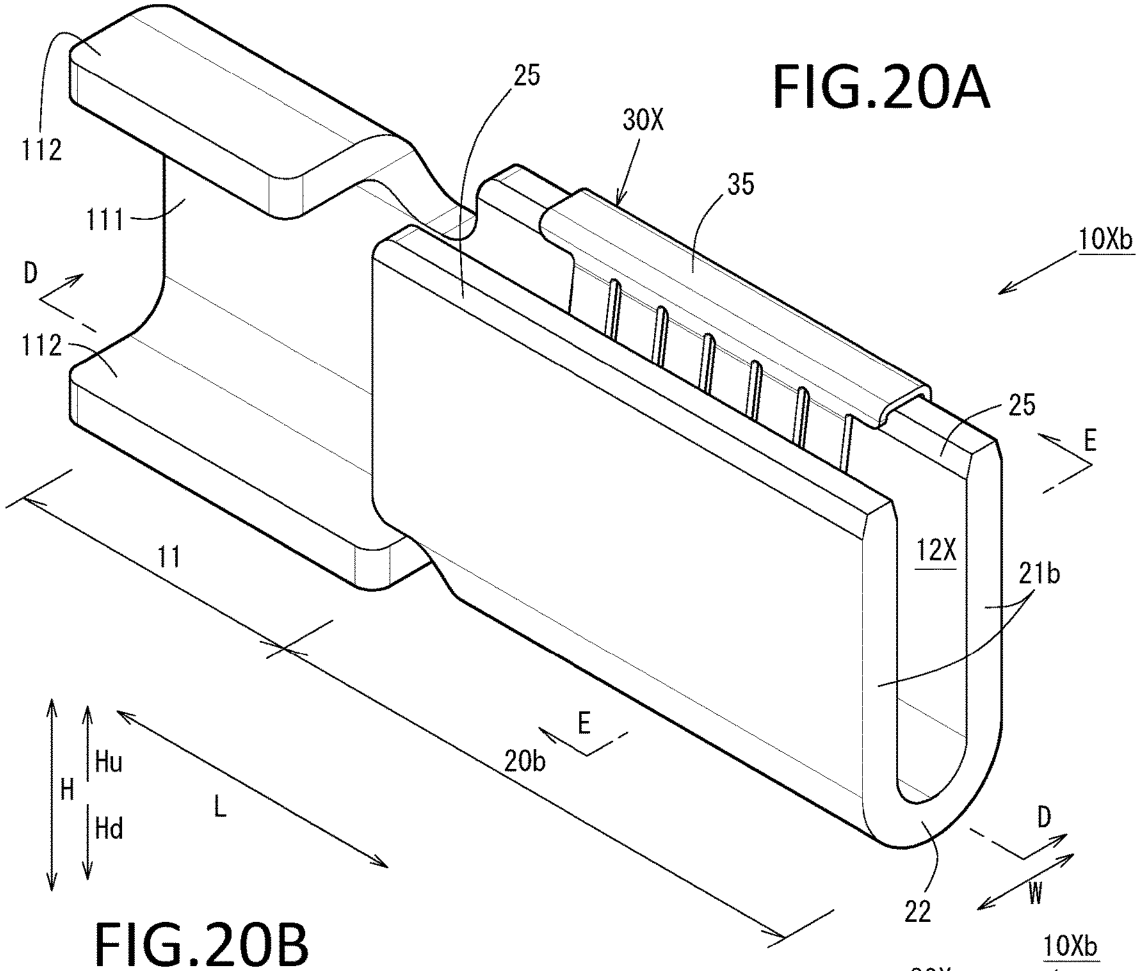
FIGS. 20A and 20B are explanatory views of a further variation of the female terminal according to the second embodiment.
Figure 20B:
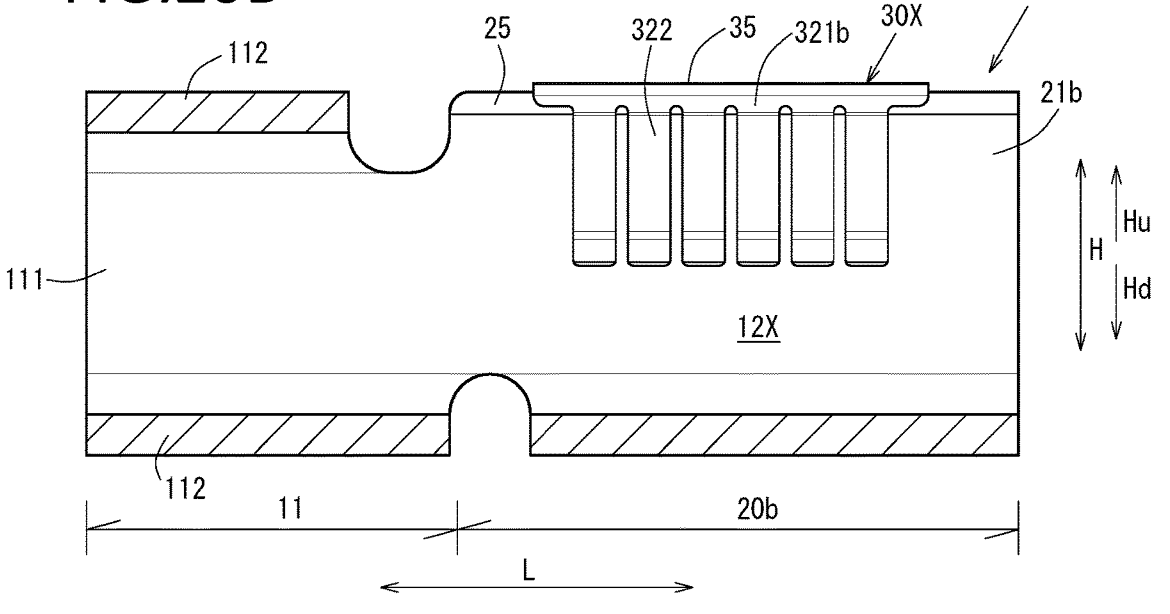
Figure 21A:
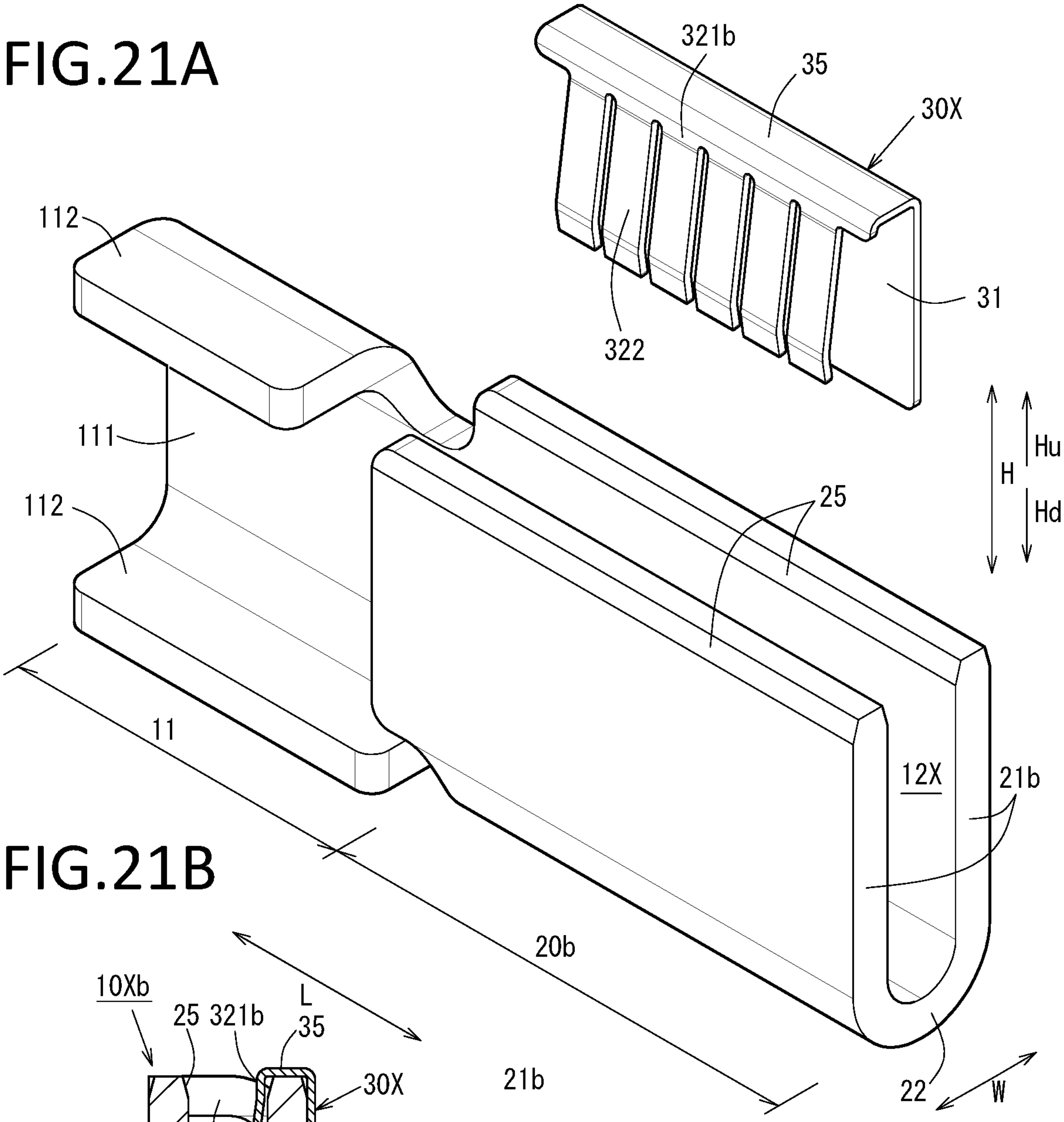
FIGS. 21A and 21B are explanatory views of a further variation of the female terminal according to the second embodiment.
Figure 21B:
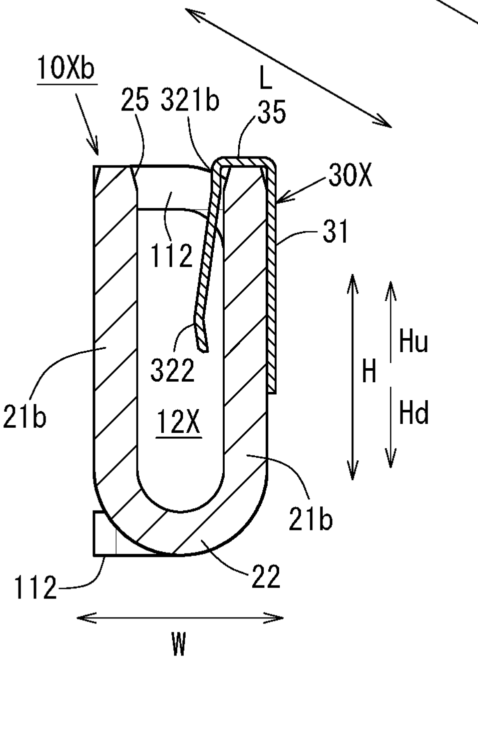

Note that FIGS. 20A and 20B, and FIGS. 21A and 21B illustrate explanatory views of the female terminal 10Xb. Specifically, FIG. 20A illustrates a perspective view of the female terminal 10Xb. FIG. 20B illustrates a cross-sectional view taken along the arrow D-D of FIG. 20A. FIG. 21A illustrates an exploded perspective view of the female terminal 10Xb. FIG. 20B illustrates a cross-sectional view taken along the arrow E-E of FIG. 20A.

As compared to the base portion 20 of the variation of the female terminal 10Xa illustrated in FIG. 19, the female terminal 10Xb does not comprise the mounting recess 23 in the upward direction Hu of the side wall 21, and is only constituted by the base portion 20Xb having the side walls 21*b* formed flat, and the other configurations are the same. Thus, the same configurations are denoted by the same reference signs, and their descriptions are omitted.

The female terminal 10Xb thus configured can achieve, as with the variation of the female terminal 10Xa illustrated in FIGS. 18A and 18B, and FIG. 19 described above, effects similar to those of the female terminal 10X.

Figures 22A, 22B, 22C:
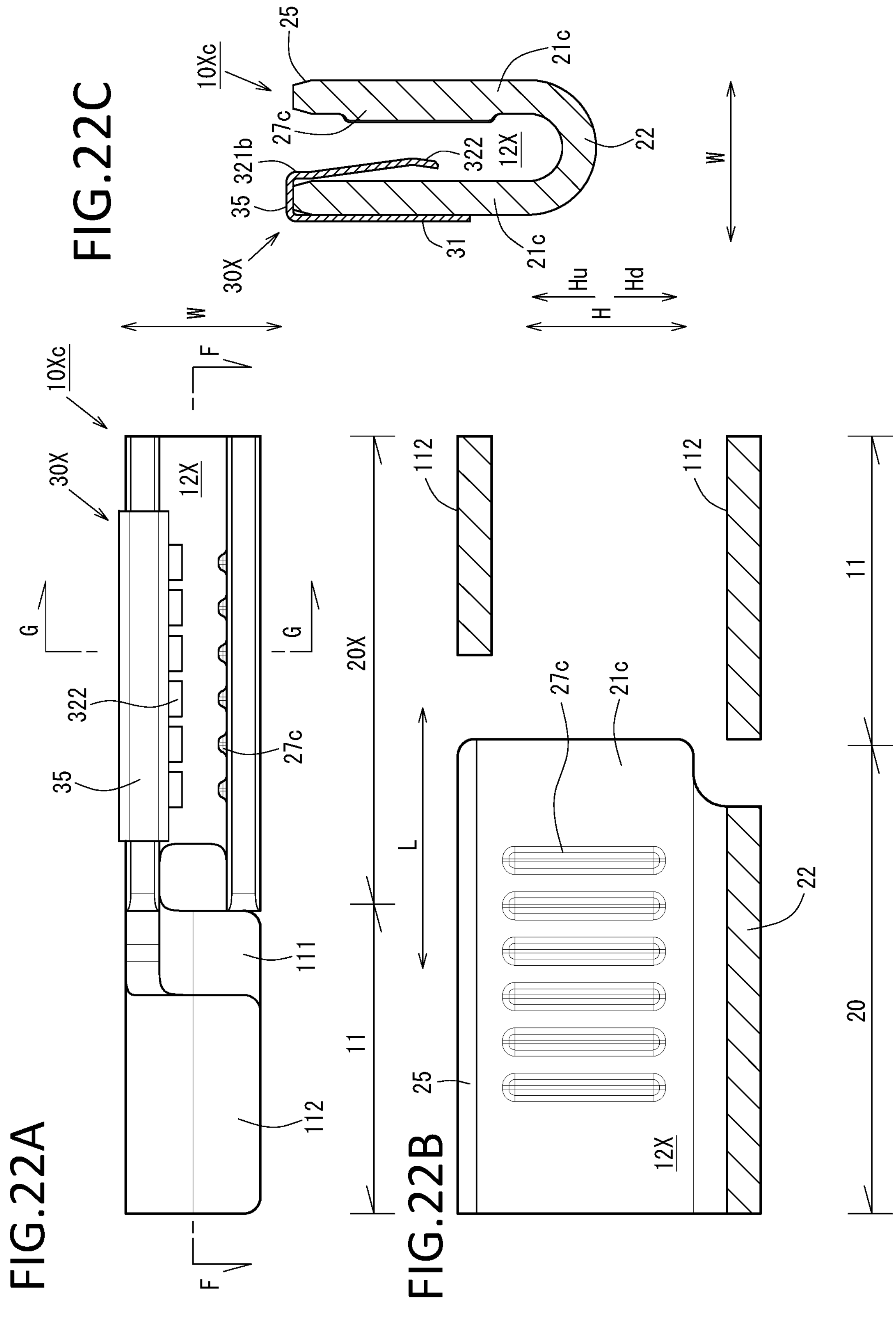
FIGS. 22A, 22B, and 22C are explanatory views of another variation of the female terminal according to the second embodiment.

Next, a female terminal 10Xc, which is a variation of the female terminal 10Xb, will be described together with FIGS. 22A, 22B, and 22C illustrating explanatory views of the female terminal 10Xc.

Note that FIG. 22A illustrates a plan view of the female terminal 10Xc. FIG. 22B illustrates a cross-sectional view taken along the arrow F-F of FIG. 22A. FIG. 22C illustrates a cross-sectional view taken along the arrow G-G of FIG. 22A.

Since the female terminal 10Xc illustrated in FIGS. 22A, 22B, and 22C is the same as the female terminal 10Xb described above except that contact ribs 27*c* are provided at the side wall 21*c* on the side (lower side in FIG. 22A) not mounted with the spring member 30X. Thus, the same configurations are denoted by the same reference signs, and their descriptions are omitted.

Specifically, in the female terminal 10Xc, of a pair of side walls 21*c* opposing each other in the width direction W, a side wall 21*c* on the side not mounted with the spring member 30X is provided, on the inner side surface on the side of the insertion space 12X, with a plurality of contact ribs 27*c* extending in the height direction H.

The contact ribs 27*c* are each provided at a position in the length direction L opposing the respective one of the arm springs 322 of the spring member 30X mounted on the opposing side wall 21*c*, and are formed in a length extending from the downward direction Hd from the length direction part 321*b* to a position slightly on the lower side of the arm spring 322. Thus, six contact ribs 27*c* are provided corresponding to the spring member 30X having six arm springs 322.

The female terminal 10Xc thus configured achieves effects similar to those of the female terminal 10X described above. Furthermore, in the female terminal 10Xc, the connection blade 3 of the male terminal, which is to be inserted into the insertion space 12X and to be connected to the female terminal 10Xc, can be sandwiched from both sides in the width direction W by and brought into contact with the contact ribs 27*c* and the arm springs 322 to reliably achieve electrical conductivity.

Figures 23A, 23B, 23C:
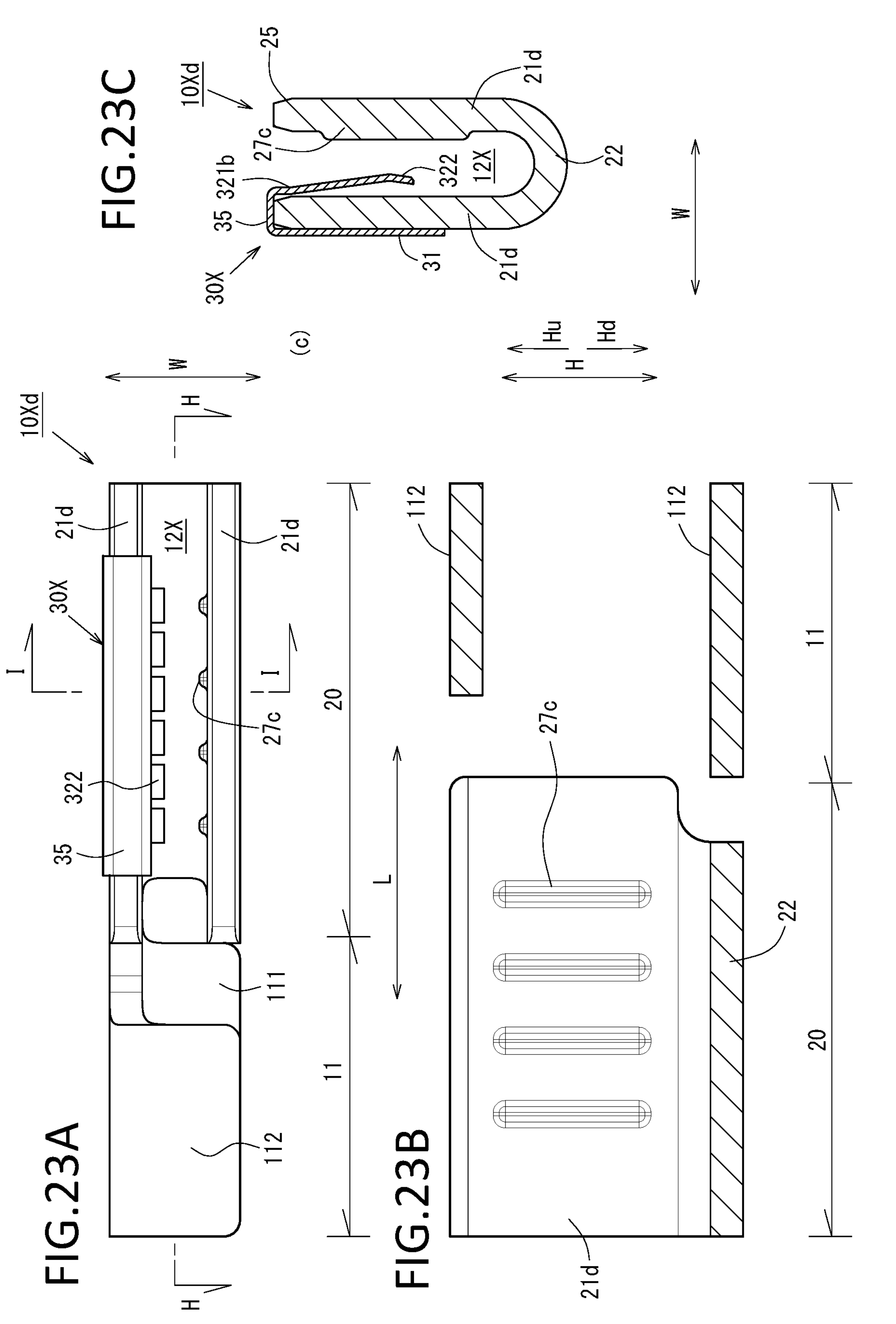
FIGS. 23A, 23B, and 23C are explanatory views of another variation of the female terminal according to the second embodiment.

Next, a female terminal 10Xd, which is a variation of the female terminal 10Xb, will be described together with FIGS. 23A, 23B, and 23C illustrating explanatory views of the female terminal 10Xd.

Note that FIG. 23A illustrates a plan view of the female terminal 10Xd. FIG. 23B illustrates a cross-sectional view taken along the arrow H-H of FIG. 23A. FIG. 23C illustrates a cross-sectional view taken along the arrow I-I of FIG. 23A.

Unlike the female terminal 10Xc comprising six contact ribs 27*c* corresponding to the number of arm springs 322, the female terminal 10Xd illustrated in FIGS. 23A, 23B, and 23C is the same as the female terminal 10Xc except that fewer contact ribs 27*c* than the number of the arm springs 322 of the spring member 30X are provided. Consequently, the same configurations are denoted by the same reference signs, and their descriptions are omitted.

Specifically, in the female terminal 10Xd, fewer contact ribs 27*c* than the number of the arm springs 322 are arranged spaced apart at predetermined intervals in the length direction L. Note that in the range in length direction L where the arm springs 322 are arranged, the contact ribs 27*c* are spaced apart at wider intervals than the intervals between the arm springs 322.

Note that in the present embodiment, four contact ribs 27*c* are provided for the six arm springs 322 provided.

The female terminal 10Xd thus constituted achieves, as with the female terminal 10Xc, effects similar to those of the female terminal 10X described above. Furthermore, in the female terminal 10Xd, the connection blade 3 of the male terminal, which is to be inserted into the insertion space 12X and to be connected to the female terminal 10Xd, can be sandwiched from both sides in the width direction W by and brought into contact with the contact ribs 27*c* and the arm springs 322 to reliably achieve electrical conductivity.

Figures 24A, 24B, 24C:
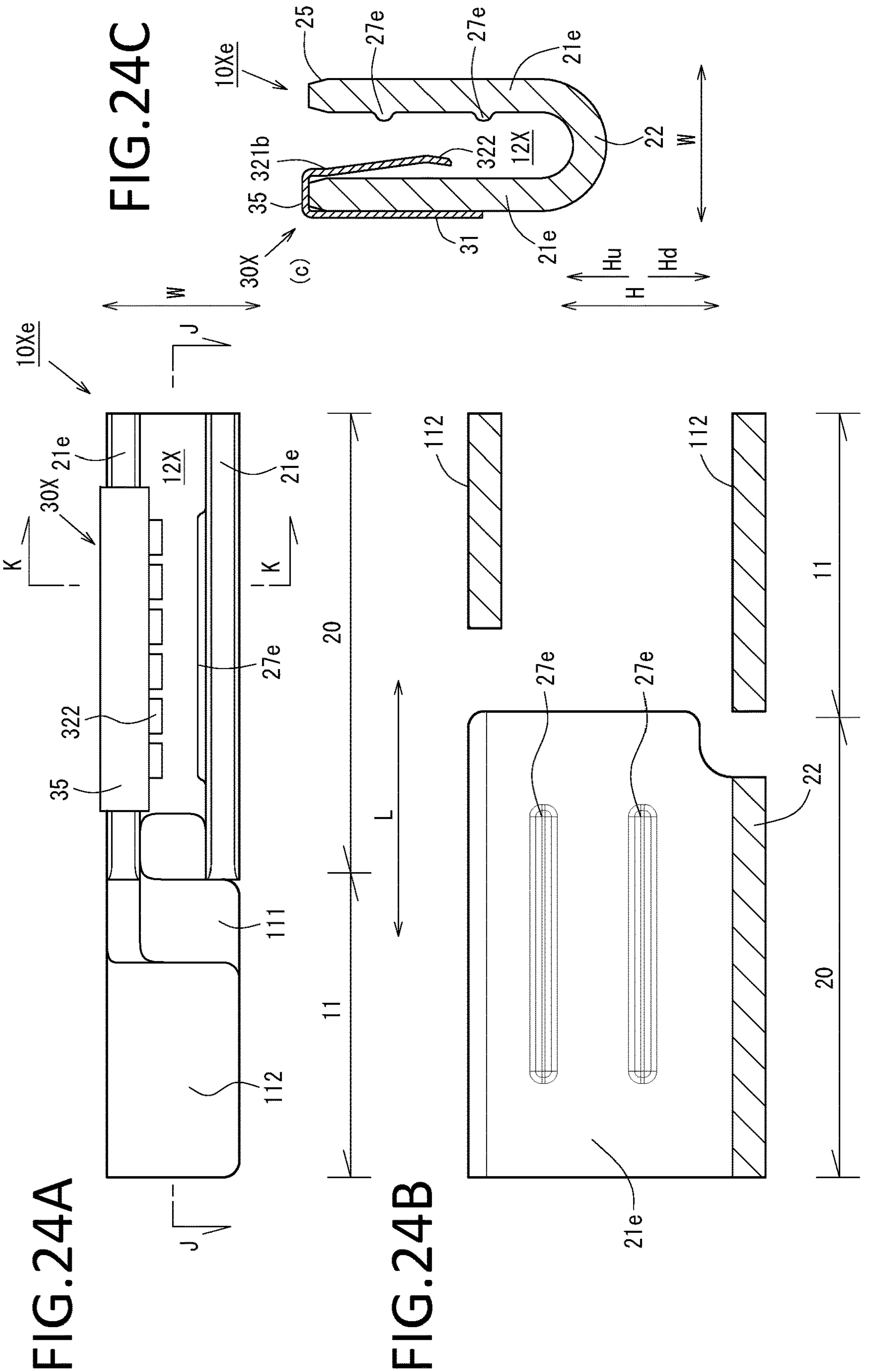
FIGS. 24A, 24B, and 24C are explanatory views of another variation of the female terminal according to the second embodiment.

Further, a female terminal 10Xe, which is a variation of the female terminal 10Xb, will be described together with FIGS. 24A, 24B, and 24C illustrating explanatory views of the female terminal 10Xe.

Note that FIG. 24A illustrates a plan view of the female terminal 10Xe. FIG. 24B illustrates a cross-sectional view taken along the arrow J-J in FIG. 24A. FIG. 24C illustrates a cross-sectional view taken along the arrow K-K in FIG. 24A.

The female terminal 10Xe illustrated in FIGS. 24A, 24B, and 24C is the same as the female terminal 10Xc except that contact ribs 27*e* extending in the length direction L are provided, as compared to the female terminal 10Xc comprising contact ribs 27*c* extending in the height direction H. Thus, the same configurations are denoted by the same reference signs, and their descriptions are omitted.

Specifically, as with the female terminal 10Xc, in the female terminal 10Xe, of a pair of side walls 21*e* opposing each other in the width direction W, a side wall 21*e* on the side not mounted with the spring members 30X is provided, on the inner side surface on the side of the insertion space 12X, a plurality of contact ribs 27*e* extending in the length direction L.

The contact ribs 27*e* are formed in a length longer in the length direction L than the range in the length direction L where the arm springs 322 are arranged. As illustrated in FIG. 24C, two contact ribs 27*e* are arranged spaced apart by a predetermined interval in the height direction H.

The female terminal 10Xe thus configured achieves effects similar to those of the female terminal 10X described above. Furthermore, in the female terminal 10Xe, the connection blade 3 of the male terminal, which is to be inserted into the insertion space 12X and to be connected to the female terminal 10Xe, can be sandwiched from both sides in the width direction W by and brought into contact with the contact ribs 27*e* and the arm springs 322 to reliably achieve electrical conductivity.

In correspondence between the configurations of the disclosure and the embodiments, a part of the male terminal of the disclosure corresponds to the connection blade 3. In the same way, the insertion space corresponds to the insertion space 12X; the side walls correspond to the side walls 21, 21*b*, 21*c*, 21*e*, and 21Y; the base portion corresponds to the base portions 20, 20Xb, 20Y, and 20Ya; the spring member corresponds to the spring members 30, 30*b*, 30*c*, 30X, and 30Y; the conductive welded portion corresponds to the conductive welded portions 40, 40*a*, and 40X, the dot-shaped conductive welded portion 40*b*, and the line-shaped conductive welded portion 40*c*; the female terminal corresponds to the female terminals 10, 10*a*, 10*b*, 10*c*, 10X, 10Xa, 10Xb, 10Xc, 10Xd, 10Xe, 10Y, and 10Ya; the terminal main body corresponds to the terminal main bodies 15, 15Y, and 15Ya; the depth direction and the direction in which the arm spring extends correspond to the height direction H; the direction intersecting the direction in which the arm spring extends corresponds to the length direction L;

the arm spring corresponds to the arm spring 322; the gripping plate corresponds to the gripping plates 31 and 31Y; the outer side of the side wall corresponds to the outer side in the width direction W of the side wall 21; the terminal-equipped electric wire corresponds to the terminal-equipped electric wire 4; the protruding portion corresponds to the contact ribs 27*c* and 27*e*; and the connector-equipped electric wire corresponds to the connector-equipped electric wire 1. However, the disclosure is not limited only to the configurations of the above described embodiments, but can be applied based on the technical ideas illustrated in the claims, and many embodiments can be obtained.

For example, in the above description, the electric wire connecting portion 11 and the base portion 20 constitute the terminal main body 15. However, instead of the electric wire connecting portion 11 to which the electric wire 5 is to be connected, a conductive member having a plate shape such as a busbar may be used.

A conductive member having a plate shape such as a busbar may be directly welded as is to the electric wire connecting portion 11. In addition, the electric wire connecting portion 11 may be structured to have a through-hole through which a fastening member can be inserted so that a conductive member having a plate shape such as a busbar is fastened and connected to the terminal main body 15. For example, the electric wire connecting portion 11 may be structured to be capable of being fastened by fastening means such as bolts. Furthermore, the base portion 20 may be provided at the tip of a conductive member having a plate shape such as a busbar.

In the above spring members 30, 30X, and 30Y, the arm spring 322 is formed along the direction in which the connection blade 3 is inserted from the height direction H, that is, along the direction from the opening (the upward direction Hu) to the deep side (the downward direction Hd) of the insertion space 12X. However, the arm spring 322 extending in the length direction L intersecting the direction from the opening (the upward direction Hu) to the deep side (the downward direction Hd) of the insertion space 12X may be provided, so that the connection blade 3 is inserted into the insertion space 12X from the tip side in the length direction L intersecting the height direction H.

In the side wall 21 described above, the chamfered portion 25 having an inclined surface shape is formed on both sides in the width direction W at the upper end portion constituting the mounting recess 23. However, the chamfered portion 25 may be formed only on the corners on the outer side in the width direction W of the side walls 21 opposing in the width direction W, or the chamfered portion 25 may be formed only on the corners on the insertion space 12X side. In addition, the chamfered portion 25 may be formed not in an inclined surface shape but in an arc cross-sectional shape.

In the female terminals 10Xc, 10Xd, and 10Xe described above, the spring member 30X is mounted on one of the pair of side walls 21, and the contact ribs 27*c* or 27*e* are provided on the inner surface on the insertion space 12X side of the other side wall 21. However, a spring member provided with the contact ribs 27*c* or 27*e* may be mounted on the other side wall 21. The number of contact ribs 27*c* and 27*e* is not limited to the number in the above examples, and an appropriate number thereof may be provided.

REFERENCE SIGNS LIST

1: Connector-equipped electric wire
3: Connection blade
4: Terminal-equipped electric wire
10, 10*a*, 10*b*, 10*c*, 10X, 10Xa, 10Xb, 10Xc, 10Xd, 10Xe, 10Y, 10Ya: Female terminal
11: Electric wire connecting portion
12X: Insertion space
15, 15Y, 15Ya: Terminal main body
20, 20Xb, 20Y, 20Ya: Base portion
21, 21*b*, 21*c*, 21*e*, 21Y: Side wall
22, 22Y: Coupling portion
27*c*, 27*e*: Contact rib
30, 30*b*, 30*c*, 30X, 30Y: Spring member
31, 31Y: Gripping plate
40, 40*a*, 40X: Conductive welded portion
40*b*: Dot-shaped conductive welded portion
40*c*: Line-shaped conductive welded portion
322: Arm spring
L: Length direction
W: Width direction
H: Height direction

The invention claimed is:

1. A female terminal, provided with:

a spring member to be electrically connected to a male terminal to be connected; and a terminal main body having a base portion, the base portion having electrical conductivity and electrically connected to the spring member, wherein the base portion has a pair of side walls spaced apart by an insertion space configured to be inserted with a part of the male terminal, the spring member is arranged between the pair of side walls in the base portion, the spring member is fixed to the side wall with a conductive welded portion with which the spring member is conductively welded to the side wall, the spring member has a plurality of arm springs arranged along a direction intersecting a depth direction from an opening toward a deep side of the insertion space, each of the plurality of arm springs having an arm shape and extending along the depth direction in the insertion space, and the conductive welded portion extends in a line along a direction intersecting the depth direction, and spans a region corresponding to all of the plurality of arm springs when viewed in the depth direction.

2. The female terminal according to claim 1, wherein the spring member is provided for each of the pair of side walls.

3. The female terminal according to claim 1, wherein the spring member is provided for one of the pair of side walls.

4. The female terminal according to claim 1, wherein the spring member comprises a gripping plate gripping the side wall in cooperation with a base of the arm spring, the gripping plate is arranged on an outer side of the side wall, and the gripping plate is conductively welded to the side wall with the conductive welded portion.

5. The female terminal according to claim 1, wherein the terminal main body is more conductive than the spring member and thicker than the spring member.

6. The female terminal according to claim 5, wherein the terminal main body has a portion in which at least a part of a surface is not plated.

7. A connector, comprising:

the female terminal according to claim 1; and a connector housing accommodating the female terminal.

8. A terminal-equipped electric wire, wherein the female terminal according to claim 1 is connected to a tip of an electric wire.

9. A connector-equipped electric wire, comprising:

the terminal-equipped electric wire according to claim 8; and a connector housing internally accommodating the female terminal connected to a tip of the terminal-equipped electric wire.

10. A wire harness, including at least one of the terminal-equipped electric wire according to claim 8.

11. A busbar, wherein the female terminal according to claim 1 is integrated with an end of the busbar.

12. The female terminal according to claim 1, wherein the spring member is welded and fixed to an inner surface of the side wall.

13. A female terminal, provided with:

a spring member to be electrically connected to a male terminal to be connected; and a terminal main body having a base portion, the base portion having electrical conductivity and electrically connected to the spring member, wherein the base portion has a pair of side walls spaced apart by an insertion space configured to be inserted with a part of the male terminal, the spring member is arranged between the pair of side walls in the base portion, the spring member is fixed to the side wall with a conductive welded portion with which the spring member is conductively welded to the side wall, a plurality of the conductive welded portions are provided along a predetermined direction, the spring member has a plurality of arm springs arranged along a direction intersecting a depth direction from an opening toward a deep side of the insertion space, each of the plurality of arm springs having an arm shape and extending along the depth direction in the insertion space, and at least one of the plurality of the conductive welded portions extends in a line along a direction intersecting the depth direction, and spans a region corresponding to all of the plurality of arm springs when viewed in the depth direction.

14. A female terminal, provided with:

a spring member to be electrically connected to a male terminal to be connected; and a terminal main body having a base portion, the base portion having electrical conductivity and electrically connected to the spring member, wherein the base portion has a pair of side walls spaced apart by an insertion space configured to be inserted with a part of the male terminal, the spring member is arranged between the pair of side walls in the base portion, the spring member is fixed to the side wall with a conductive welded portion with which the spring member is conductively welded to the side wall, the spring member is provided for one of the pair of side walls, a protruding portion protruding toward the one of the pair of side walls is provided at the other of the pair of side walls, the spring member has a plurality of arm springs arranged along a direction intersecting a depth direction from an opening toward a deep side of the insertion space, each of the plurality of arm springs having an arm shape and extending along the depth direction in the insertion space, and the conductive welded portion extends in a line along a direction intersecting the depth direction, and spans a region corresponding to all of the plurality of arm springs when viewed in the depth direction.

* * * * *